(12) United States Patent
Minamisawa

(10) Patent No.: US 11,947,253 B2
(45) Date of Patent: Apr. 2, 2024

(54) OPTICAL UNIT

(71) Applicant: NIDEC SANKYO CORPORATION, Nagano (JP)

(72) Inventor: Shinji Minamisawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 722 days.

(21) Appl. No.: 17/053,946

(22) PCT Filed: May 13, 2019

(86) PCT No.: PCT/JP2019/018860
§ 371 (c)(1),
(2) Date: Nov. 9, 2020

(87) PCT Pub. No.: WO2019/221038
PCT Pub. Date: Nov. 21, 2019

(65) Prior Publication Data
US 2021/0223663 A1   Jul. 22, 2021

(30) Foreign Application Priority Data

May 15, 2018 (JP) ................................. 2018-093806
Aug. 23, 2018 (JP) ................................. 2018-156088

(51) Int. Cl.
*G03B 30/00* (2021.01)
*G03B 5/06* (2021.01)
(Continued)

(52) U.S. Cl.
CPC ............... *G03B 5/06* (2013.01); *G03B 30/00* (2021.01); *H04N 23/57* (2023.01);
(Continued)

(58) Field of Classification Search
CPC ...................... G03B 5/06; G03B 30/00; G03B 2205/0007; G03B 2205/0023; G03B 2205/0069;
(Continued)

(56) References Cited

U.S. PATENT DOCUMENTS 11,300,802 B2 *   4/2022   Minamisawa ....... G02B 27/646
11,402,650 B2 *   8/2022   Sue ....................... G02B 27/646
(Continued)

FOREIGN PATENT DOCUMENTS

JP      2011039113 A    2/2011
JP      2014006522 A    1/2014

OTHER PUBLICATIONS

International Search Report for International Application No. PCT/JP2019/018860; dated Jul. 16, 2019.

*Primary Examiner* — Derek S. Chapel
(74) *Attorney, Agent, or Firm* — CANTOR COLBURN LLP

(57) ABSTRACT

An optical unit may include a movable body including an optical module, a fixed body which holds the movable body in a movable state, a gimbal mechanism including a first support part which swingably supports the movable body around a first axial line intersecting an optical axis direction of the optical module, and a second support part which is swingably supported by a member of the fixed body around a second axial line intersecting the optical axis direction and a direction of the first axial line, and a shake correction drive mechanism structured to drive the movable body around the first axial line and around the second axial line.

24 Claims, 32 Drawing Sheets

(51) Int. Cl.
*H04N 23/57* (2023.01)
*H04N 23/68* (2023.01)

(52) U.S. Cl.
CPC ............... *H04N 23/687* (2023.01); *G03B 2205/0007* (2013.01); *G03B 2205/0023* (2013.01); *G03B 2205/0069* (2013.01)

(58) Field of Classification Search
CPC ...... H04N 23/57; H04N 23/687; H04N 23/00; H04N 23/60; G02B 27/646
See application file for complete search history.

(56) References Cited

U.S. PATENT DOCUMENTS

| | | | |
|---|---|---|---|
| 11,493,779 B2* | 11/2022 | Minamisawa | G03B 5/00 |
| 11,500,221 B2* | 11/2022 | Takei | G02B 7/003 |
| 11,526,023 B2* | 12/2022 | Takei | G02B 7/005 |
| 11,543,673 B2* | 1/2023 | Minamisawa | G02B 27/646 |
| 11,567,340 B2* | 1/2023 | Yanagisawa | G03B 5/06 |
| 2016/0124242 A1* | 5/2016 | Minamisawa | G02B 27/646 |
| | | | 359/557 |
| 2017/0176766 A1* | 6/2017 | Sue | G02B 27/646 |
| 2017/0176767 A1* | 6/2017 | Yanagisawa | G02B 27/646 |
| 2018/0129066 A1* | 5/2018 | Minamisawa | G02B 7/021 |
| 2018/0284569 A1* | 10/2018 | Minamisawa | G02B 27/646 |

* cited by examiner

OPTICAL UNIT

CROSS REFERENCE TO RELATED APPLICATION

The present application is a national stage application of International Application No. PCT/JP2019/018860 filed on May 13, 2019 which claims priority under 35 U.S.C. § 119 to Japanese Application No. 2018-156088 filed on Aug. 23, 2018, and Japanese Application No. 2018-093806 filed on May 15, 2018, the entire content of which is incorporated herein by reference.

TECHNICAL FIELD

The present invention relates to an optical unit with a shake correction function which is mounted on a cell phone with a camera or the like.

BACKGROUND ART

An optical unit described in Patent Literature 1 has been known as this type of an optical unit with a shake correction function. The optical unit is provided with functions for correcting pitching (vertical swing) and yawing (lateral swing).

Specifically, an optical unit 100 includes a gimbal mechanism 30 by utilizing corners of an optical module 10 and corners of a rectangular tube-shaped body part 210 of a fixed body 20. In other words, a rectangular movable frame 32 is disposed between a second frame 42 in a rectangular shape of the optical module 10 and a rectangular frame 25 fixed to the rectangular tube-shaped body part 210 and thereby a first corner part 321 and a third corner part 323 facing the first corner part 321 of the movable frame 32 are structured so as to be swingably supported at two corresponding corner parts of the rectangular frame 25. A second corner part 322 and a fourth corner part 324 facing the second corner part 322 of the movable frame 32 are structured so as to swingably support two remaining and corresponding corner parts of the second frame 42.

CITATION LIST

Patent Literature

[PTL 1] Japanese Patent Laid-Open No. 2014-6522

SUMMARY OF THE INVENTION

Problems to be Solved by the Invention

In the conventional optical unit, the gimbal mechanism as a mechanism for correcting pitching and yawing is disposed so as to surround the whole of a periphery of the side face of the movable body including the optical module. Therefore, it is difficult to reduce a size of the optical unit in a direction intersecting an optical axis direction (on a side of a side face).

An objective of the present invention is to realize downsizing of an optical unit including a shake correction drive mechanism structured to drive a movable body having an optical module around a first axial line and around a second axial line.

SUMMARY

To solve the above-mentioned problem, at least one embodiment of the present invention may provide an optical unit including a movable body having an optical module, a fixed body which holds the movable body in a movable state, a gimbal mechanism including a first support part, which swingably supports the movable body around a first axial line intersecting an optical axis direction of the optical module, and a second support part which is swingably supported by a member of the fixed body around a second axial line intersecting the optical axis direction and a direction of the first axial line, and a shake correction drive mechanism structured to drive the movable body around the first axial line and around the second axial line. The gimbal mechanism may include a gimbal frame part which is disposed on one of an object side and an opposite side to an object to be photographed with respect to the optical module, a first support part extended part which is extended from the gimbal frame part in the optical axis direction and has a first support part, and a second support part extended part which is extended from the gimbal frame part in the optical axis direction and has a second support part.

According to the embodiment of the present invention, the gimbal frame part may be disposed on one of an object side and an opposite side to an object to be photographed with respect to the optical module. In other words, the gimbal mechanism does not surround the whole of a periphery of a side face of the movable body having the optical module, and the first support part extended part and the second support part extended part exist around the periphery of the side face. Therefore, a size in a direction intersecting the optical axis direction (on a side of the side face) can be reduced in comparison with a conventional gimbal mechanism.

Further, the gimbal mechanism may be structured so as to include a first support part which swingably supports the movable body around a first axial line and a second support part which is swingably supported by a member of the fixed body around a second axial line intersecting the optical axis direction and the first axial line direction. This support structure may be provided and thus, the size can be reduced as described above and, in addition, a degree of freedom of arrangement of the shake correction drive mechanism structured to drive the movable body around the first axial line and the second axial line is increased, and a magnetic circuit can be made larger without increasing the entire size and, as a result, a driving torque can be improved and reduction of power consumption can be attained.

In the present invention, the optical unit may be further structured so that the gimbal frame part is formed in a plate shape.

According to the embodiment of the present invention, the gimbal frame part may be formed in a plate shape and thus, a size in the optical axis direction can be also reduced.

In an embodiment of the present invention, the optical unit may be further structured so that at least one of the first support part extended part and the second support part extended part is formed in a plate shape.

According to the embodiment of the present invention, at least one of the first support part extended part and the second support part extended part may be formed in a plate shape and thus, a size in a direction intersecting the optical axis direction (on a side of the side face) can be further reduced.

In an embodiment of the present invention, the optical unit may be further structured so that the first support part is fixed to an inner side of the first support part extended part which faces the movable body and a portion which contacts and supports a member of the movable body is a convex curved face, and the second support part is fixed to an outer side of the second support part extended part which faces the fixed body and a portion which is contacted and supported by a member of the fixed body is a convex curved face.

According to the embodiment of the present invention, the first support part and the second support part of the gimbal mechanism may be formed of the convex curved face and thus, assembling of the gimbal mechanism and the members of the movable body and the fixed body is easily performed.

In an embodiment of the present invention, the optical unit may be further structured so that the movable body is provided with an outer side portion located on an outer side with respect to the first support part extended part, the first support part is fixed to an outer side of the first support part extended part which faces the outer side portion and a portion which contacts and supports the outer side portion is a convex curved face, and the second support part is fixed to an outer side of the second support part extended part which faces the fixed body and a portion which is contacted and supported by a member of the fixed body is a convex curved face.

According to the embodiment of the present invention, the first support part and the second support part of the gimbal mechanism may be formed of the convex curved face and thus, assembling of the gimbal mechanism and the members of the movable body and the fixed body is easily performed.

In an embodiment of the present invention, the optical unit may be further structured so that the movable body is provided with an outer side portion located on an outer side with respect to the first support part extended part, the outer side portion is provided with a fixed protruded part, the first support part is formed on an outer side of the first support part extended part so as to face the protruded part and a portion which contacts and supports the protruded part is a concave spherical surface, and the second support part is fixed to an outer side of the second support part extended part which faces the fixed body and a portion which is contacted and supported by a member of the fixed body is a convex curved face.

According to the embodiment of the present invention, the first support part of the gimbal mechanism may be formed of the concave spherical surface and the second support part may be formed of the convex curved face and thus, assembling of the gimbal mechanism and the members of the movable body and the fixed body is easily performed.

In an embodiment of the present invention, the optical unit may further include a protruded part fixed to a member of the movable body, the first support part may be formed on an inner side of the first support part extended part so as to face the protruded part of the movable body and a portion which contacts and supports the protruded part is a concave spherical surface, and the second support part is fixed to an outer side of the second support part extended part which faces the fixed body and a portion which is contacted and supported by a member of the fixed body is a convex curved face.

According to the embodiment of the present invention, the first support part of the gimbal mechanism may be formed of the concave spherical surface and the second support part may be formed of the convex curved face and thus, assembling of the gimbal mechanism and the members of the movable body and the fixed body is easily performed.

In an embodiment of the present invention, the optical unit may be further structured so that an extended angle of the first support part extended part with respect to the gimbal frame part is set to an angle displaced to an inner side so as to elastically contact with a member of the movable body, and an extended angle of the second support part extended part with respect to the gimbal frame part is set to an angle displaced to an outer side so as to elastically contact with a member of the fixed body.

According to the embodiment of the present invention, the first support part extended part and the second support part extended part may be elastically contacted with the member of the movable body and the member of the fixed body due to the extended angles and thus, strong support and smooth swinging in the first support part and the second support part can be easily realized.

In an embodiment of the present invention, the optical unit may be further structured so that an extended angle of the first support part extended part with respect to the gimbal frame part is set to an angle displaced to an outer side so as to elastically contact with a member of the movable body, and an extended angle of the second support part extended part with respect to the gimbal frame part is set to an angle displaced to an outer side so as to elastically contact with a member of the fixed body.

According to the embodiment of the present invention, the first support part extended part and the second support part extended part may be elastically contacted with the member of the movable body and the member of the fixed body due to the extended angles and thus, strong support and smooth swinging in the first support part and the second support part can be easily realized.

In an embodiment of the present invention, the optical unit may be further structured so that the gimbal frame part is formed in an "X"-shape by a first extended part which is extended in a direction of the first axial line and a second extended part which is extended in a direction of the second axial line with the optical axis as a center.

According to the embodiment of the present invention, the gimbal frame part may be formed in an "X"-shape by a first extended part which is extended in the first axial line direction and a second extended part which is extended in the second axial line direction with the optical axis as a center. The gimbal frame part may be formed in the "X"-shape as described above and thus, swinging of the gimbal mechanism around the first axial line and around the second axial line can be smoothly performed.

In an embodiment of the present invention, the optical unit may be further structured so that the gimbal mechanism is formed of a metal plate, and the first support part extended part and the second support part extended part are formed by bending the first extended part and the second extended part of the gimbal frame part which is formed in the "X"-shape.

According to the embodiment of the present invention, the gimbal mechanism may be formed of a metal plate and, in addition, the first support part extended part and the second support part extended part may be formed by bending the first extended part and the second extended part of the gimbal frame part which is formed in the "X"-shape and thus, manufacturing of the gimbal mechanism is easily performed.

In an embodiment of the present invention, the optical unit may be further structured so that a gap space between the second extended part of the gimbal frame part and the movable body is larger than a gap space between the first extended part and the movable body.

In other words, the gimbal frame part may be formed so that a height in the optical axis direction of a tip end part of the first extended part is lower than a height in the optical axis direction of a tip end part of the second extended part and is located at a closer position to the movable body.

According to the embodiment of the present invention, a tip end part of the first extended part may be located at a position closer to the movable body than a tip end part of the second extended part, and a movable region (movable gap) of the first extended part in the optical axis direction on one of an object side and an opposite side to an object to be photographed may be set to be wider. Further, the tip end part of the first extended part may be located at a lower position in the optical axis direction than the tip end part of the second extended part, and the gimbal frame part may be provided with a bent shape and thus, the tip end part of the first extended part and the tip end part of the second extended part do not become flush to the movable body. Therefore, a movable gap of the movable body in the optical axis direction can be easily provided due to a difference of the positions and thus, downsizing in the optical axis direction can be further realized.

In an embodiment of the present invention, the optical unit may be further structured so that the gimbal frame part is disposed on an object side with respect to the optical module, and a center part of the gimbal frame part on a light incident part side of the optical module is formed with an opening part.

According to the embodiment of the present invention, the gimbal frame part may be provided with an opening part and may be disposed on an object side with respect to the optical module. Therefore, the movable body having the optical module can be assembled in a state that the gimbal mechanism has been attached to the fixed body and, as a result, assembling work is easily performed.

Further, although the shake correction drive mechanism includes wiring for power supply for driving, the wiring can be structured to extend out from an opposite side to an object to be photographed and the wiring can be simply performed.

In an embodiment of the present invention, the optical unit may be further structured so that the shake correction drive mechanism is structured of a set of a coil and a magnet, and one of the coil and the magnet is disposed on the fixed body and the other is disposed on the movable body.

According to the embodiment of the present invention, the shake correction drive mechanism may be structured of a set of a coil and a magnet, and one of the coil and the magnet may be disposed on the fixed body and the other may be disposed on the movable body. As a result, downsizing in the optical axis direction can be realized.

In an embodiment of the present invention, the optical unit may be further structured so that the gimbal mechanism includes a first retreated part in a portion where the gimbal frame part is connected with the first support part extended part so as to lower a height in an extended direction of the first support part extended part with respect to a face of the gimbal frame part.

When a shake correction is performed by the shake correction drive mechanism, in the gimbal mechanism, a connecting portion where the gimbal frame part is connected with the first support part extended part may be moved in the extended direction. In other words, the "connecting portion" may be moved in the optical axis direction and thus, a space for allowing the movement is required in a corresponding region around the gimbal mechanism in the optical axis direction.

According to the embodiment of the present invention, the connecting portion of the gimbal frame part may be provided with the first retreated part. Therefore, a space for allowing movement in the optical axis direction (corresponding region in the optical axis direction) can be reduced by the first retreated part. As a result, downsizing in the optical axis direction of the optical unit can be further attained.

In an embodiment of the present invention, the optical unit may be further structured so that the movable body includes a second retreated part which is retreated in the same direction as the first retreated part in portions along the gimbal frame part which correspond to the first support part extended part and the second support part extended part.

When a shake correction is performed by the shake correction drive mechanism, the movable body is moved in the optical axis direction through the movement of the gimbal frame part and thus, a space for allowing the movement may be desired in a corresponding region around the movable body in the optical axis direction.

According to the embodiment of the present invention, the movable body may include the second retreated part in portions along the gimbal frame part which correspond to the first support part extended part and the second support part extended part. When the second retreated part is provided, a space for allowing movement in the optical axis direction (corresponding region in the optical axis direction) can be reduced. As a result, downsizing in the optical axis direction of the optical unit can be further attained.

In an embodiment of the present invention, the optical unit may be further structured so that the movable body is formed in a rectangular shape when viewed in the optical axis direction, and the second retreated part is provided at corner parts of the movable body.

In a case that the movable body is formed in a rectangular shape, it may be often structured so that, when a shake correction is performed by the shake correction drive mechanism, corner parts of the movable body are moved largest in the optical axis direction.

According to the embodiment of the present invention, the second retreated part may be provided at corner parts of the movable body and thus, the above-mentioned downsizing can be realized effectively.

In an embodiment of the present invention, the optical unit may be further structured so that the movable body includes an intermediate frame body which turnably holds the optical module around the optical axis and is supported by the first support part.

According to the embodiment of the present invention, the movable body may include the intermediate frame body and thus, the optical module can be turned around the optical axis. In other words, the optical module can be moved around another axial line which is different from the first axial line and second axial line. As a result, rolling correction of the optical module can be performed.

In an embodiment of the present invention, the optical unit may be further structured so that the intermediate frame body is provided with a flat plate part which is disposed on one of an object side and an opposite side to an object to be photographed of the optical module, side plate parts which are extended from the flat plate part in the optical axis direction and are respectively located along the first support part extended part and the second support part extended part, and a third retreated part which is provided in a portion where the flat plate part is connected with the side plate part and is retreated in the same direction as the first retreated part.

When a shake correction is performed by the shake correction drive mechanism, through the movement of the gimbal frame part, in other words, the "connecting portion" may be moved in the optical axis direction and thus, a space for allowing the movement is required in a corresponding region around the intermediate frame body in the optical axis direction.

According to the embodiment of the present invention, the intermediate frame body is provided with the third retreated part in the connecting portion. A space for allowing movement in the optical axis direction (corresponding region in the optical axis direction) can be reduced by the third retreated part. As a result, downsizing in the optical axis direction of the optical unit can be further attained.

Effects of the Invention

According to at least one embodiment of the present invention, downsizing of the optical unit including the shake correction drive mechanism structured to drive the movable body having the optical module around the first axial line and around the second axial line can be realized.

DESCRIPTION OF EMBODIMENTS

Figure 1:
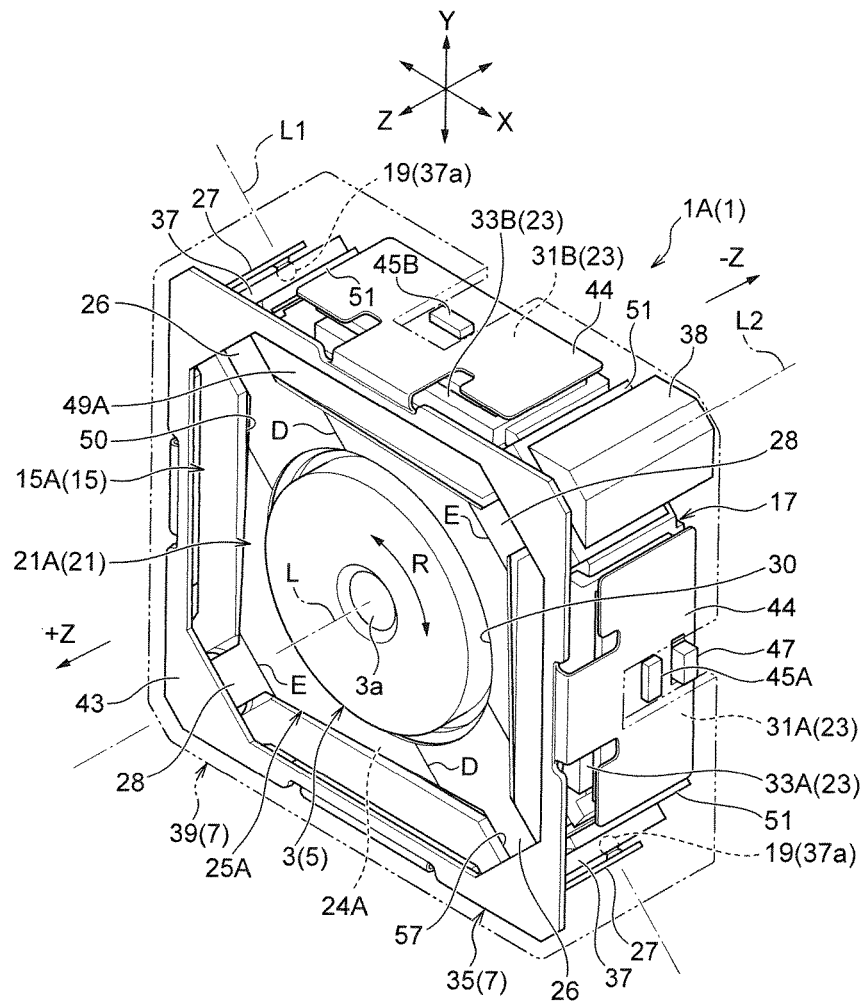
FIG. 1 is a view showing a first embodiment of the present invention and is a perspective view showing an optical unit in which an outer casing is indicated in a transparent manner.
Figure 2:
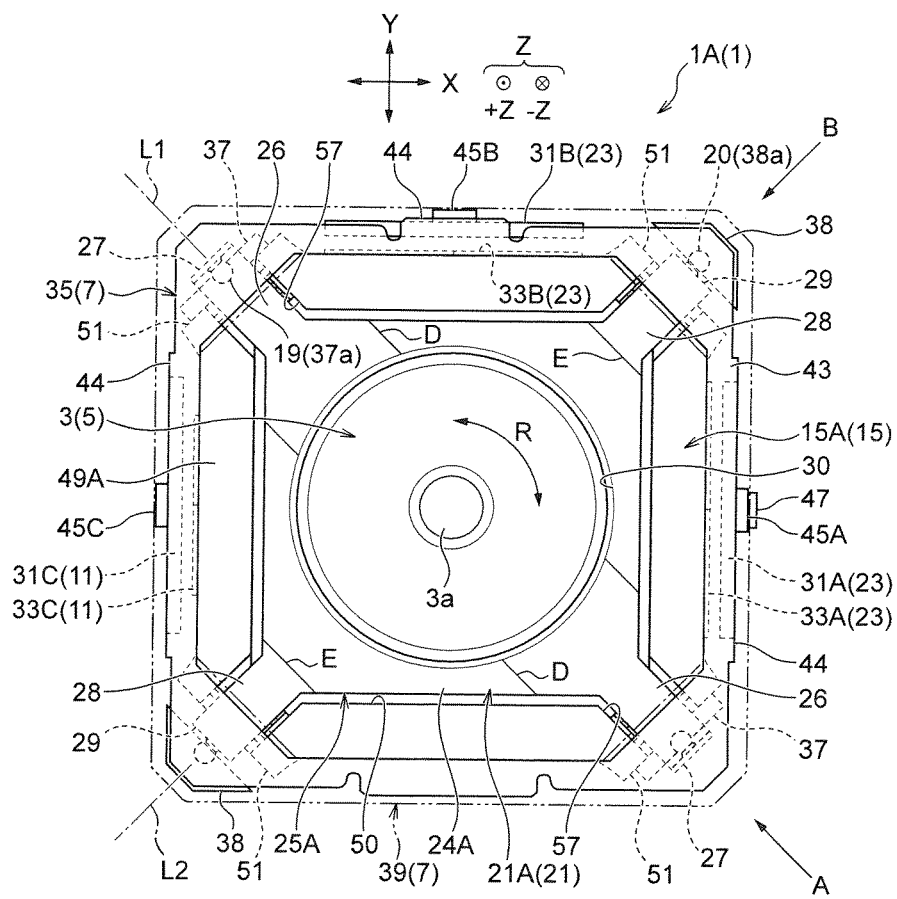
FIG. 2 is a view showing the first embodiment of the present invention and is a front view showing the optical unit in which the outer casing is indicated in a transparent manner.
Figure 3:
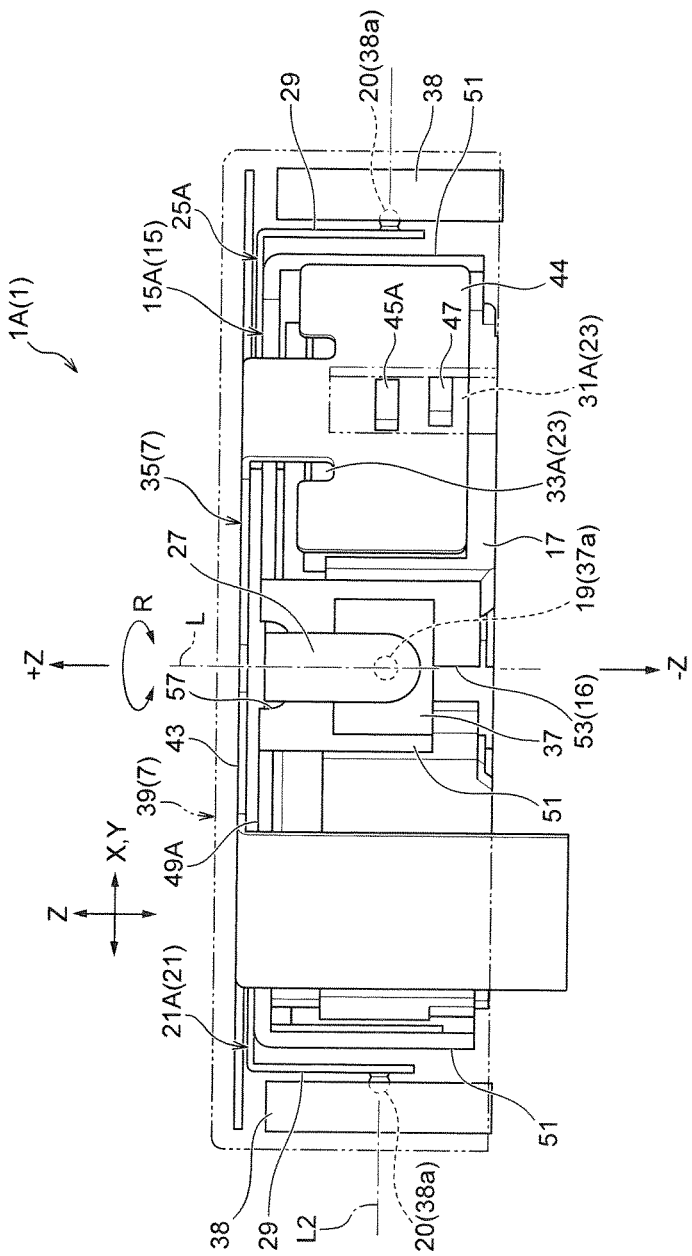
FIG. 3 is a view showing the first embodiment of the present invention and is a view showing the optical unit which is viewed in a direction of the arrow "A" in FIG. 2 and in which the outer casing is indicated in a transparent manner.
Figure 4:
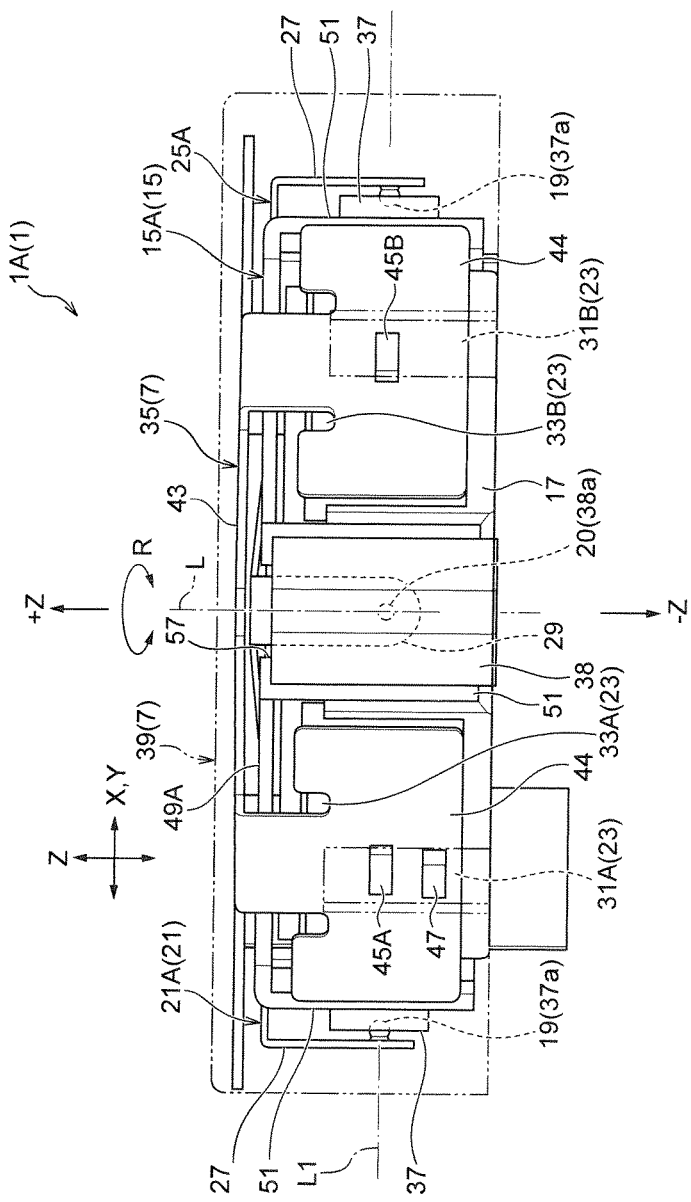
FIG. 4 is a view showing the first embodiment of the present invention and is a view showing the optical unit which is viewed in a direction of the arrow "B" in FIG. 2 and in which the outer casing is indicated in a transparent manner.

Optical units in accordance with the present invention will be described in detail below with reference to the accompanying drawings in which eight embodiments are described as examples, i.e., a first embodiment shown in FIG. 1 through FIG. 12, a second embodiment shown in FIG. 13 through FIG. 17, a third embodiment shown in FIG. 18 through FIG. 21, a fourth embodiment shown in FIG. 22 through FIG. 25, a fifth embodiment shown in FIG. 26 through FIG. 29, a sixth embodiment shown in FIG. 30, a seventh embodiment shown in FIG. 31, and an eighth embodiment shown in FIG. 32.

In the following descriptions, first, a schematic entire structure of an optical unit in a first embodiment will be described with reference to FIG. 1 through FIG. 7 as an example. Next, a specific structure of the optical unit in accordance with the first embodiment of the present invention will be described in detail with reference to FIG. 8 through 12.

After that, operation modes of the optical unit in accordance with the first embodiment of the present invention will be described by dividing into correction of pitching and yawing and correction of rolling and, after that, operations and effects of the optical unit in accordance with the first embodiment of the present invention will be described.

Next, a specific structure of an optical unit in accordance with a second embodiment of the present invention will be described with reference to FIG. 13 through FIG. 17 mainly regarding a difference from the first embodiment, and an operation mode and operations and effects of the optical unit in accordance with the second embodiment of the present invention will be described. Next, a specific structure of an optical unit in accordance with a third embodiment of the present invention and a structure of its modified embodiment will be described with reference to FIG. 18 through FIG. 21 mainly regarding a difference from the first embodiment, and operations and effects of the optical unit in accordance with the third embodiment of the present invention will be described.

Next, a specific structure of an optical unit in accordance with a fourth embodiment of the present invention and a structure of its modified embodiment will be described with reference to FIG. 22 through FIG. 25 mainly regarding a difference from the first embodiment, and operations and effects of the optical unit in accordance with the fourth embodiment of the present invention will be described.

Next, a specific structure of an optical unit in accordance with a fifth embodiment of the present invention and a structure of its modified embodiment will be described with reference to FIG. 26 through FIG. 29 mainly regarding a difference from the first embodiment, and operations and effects of the optical unit in accordance with the fifth embodiment of the present invention will be described.

Next, a specific structure of a first support part in accordance with a sixth embodiment of the present invention will be described with reference to FIG. 30 mainly regarding a difference from the first embodiment. Next, a specific structure of a first support part in accordance with a seventh embodiment of the present invention will be described with reference to FIG. 31 mainly regarding a difference from the first embodiment and the sixth embodiment. Next, a specific structure of a first support part in accordance with an eighth embodiment of the present invention will be described with reference to FIG. 32 mainly regarding a difference from the first embodiment and the seventh embodiment.

In addition, other embodiments of the present invention whose partial structures are different from these eight embodiments will be described.

First Embodiment (1) Schematic Entire Structure of Optical Unit (See FIG. 1 Through FIG. 7)

An optical unit 1 in a first embodiment in accordance with the present invention includes a movable body 5 having an optical module 3, a fixed body 7 which holds the movable body 5 in a state capable of moving at least in a pitching (vertical swing) direction "Y" and in a yawing (lateral swing) direction "X", a gimbal mechanism 21A which includes a first support part 19 swingably supporting the movable body 5 around a first axial line "L1" intersecting an optical axis direction "Z" of the optical module 3 and a second support part 20 supported by a member of the fixed body 7 swingably around a second axial line "L2" intersecting the optical axis direction "Z" and the first axial line "L1" direction, and a shake correction drive mechanism 23 structured to drive the movable body 5 around the first axial line "L1" and around the second axial line "L2".

The gimbal mechanism 21A is provided with a gimbal frame part 25A, which is disposed on one of an object side "+Z" with respect to the optical module 3 and an opposite side "−Z" to an object to be photographed, first support part extended parts 27 which are extended in the optical axis direction "Z" from the gimbal frame part 25A and are provided with first support parts 19, and second support part extended parts 29 which are extended in the optical axis direction "Z" from the gimbal frame part 25A and are provided with second support parts 20.

Further, in the first embodiment, a rolling support mechanism 9 (FIG. 5 and FIG. 8) is provided which turnably supports the movable body 5 around the optical axis "L" of the optical module 3 with respect to the fixed body 7, and a rolling drive mechanism 11 (FIG. 2 and FIG. 5) structured to turn the movable body 5 around the optical axis "L" is provided.

Further, the rolling support mechanism 9 is structured so as to include elastic members 13 which are disposed at plural positions around the optical axis "L" on a circumference "C" (FIG. 8) having a predetermined radius between the movable body 5 and the fixed body 7 in directions "X" and "Y"

intersecting the optical axis "L". The movable body 5 is turnably supported by the elastic members 13 around the optical axis "L".

Figure 8:
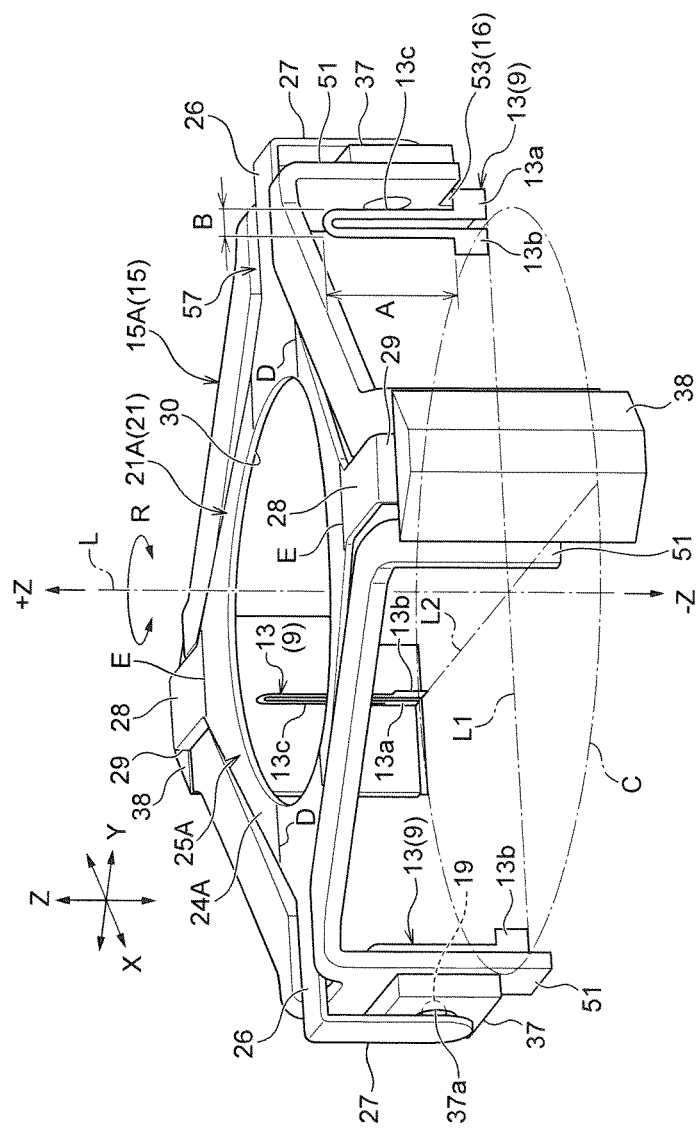
FIG. 8 is a view showing the first embodiment of the present invention and is a perspective view showing a gimbal mechanism, an intermediate frame body, a first bearing part, a second bearing part and an elastic member of the optical unit.

Further, as shown in FIG. 8 in the first embodiment, the elastic member 13 is structured of a plate spring 13 (the reference sign of the elastic member is similarly used) which can be resiliently bent and deformed around the optical axis "L". Further, in this embodiment, an intermediate frame body 15A which connects the movable body 5 with the fixed body 7 in a state that movable body 5 is permitted to move (turn) in a rolling direction "R" is provided between the movable body 5 and the fixed body 7.

One end part 13*a* of the plate spring 13 is fixed to a first fixed part 16 which is formed in the intermediate frame body 15A. The other end part 13*b* of the plate spring 13 is fixed to a second fixed part 18 formed in a holder frame 17 which holds the optical module 3 and is integrally moved with the optical module 3. In this embodiment, fixing of the plate spring 13 to the first fixed part 16 and the second fixed part 18 is performed by adhesion, fitting, engaging or the like.

Further, in the first embodiment, the gimbal frame part 25A is disposed on an object side, i.e., the "+Z" side with respect to the optical module 3, and an opening part 30 is formed in a center part of the gimbal frame part 25A on a light incident part side of the optical module 3.

Figure 5:
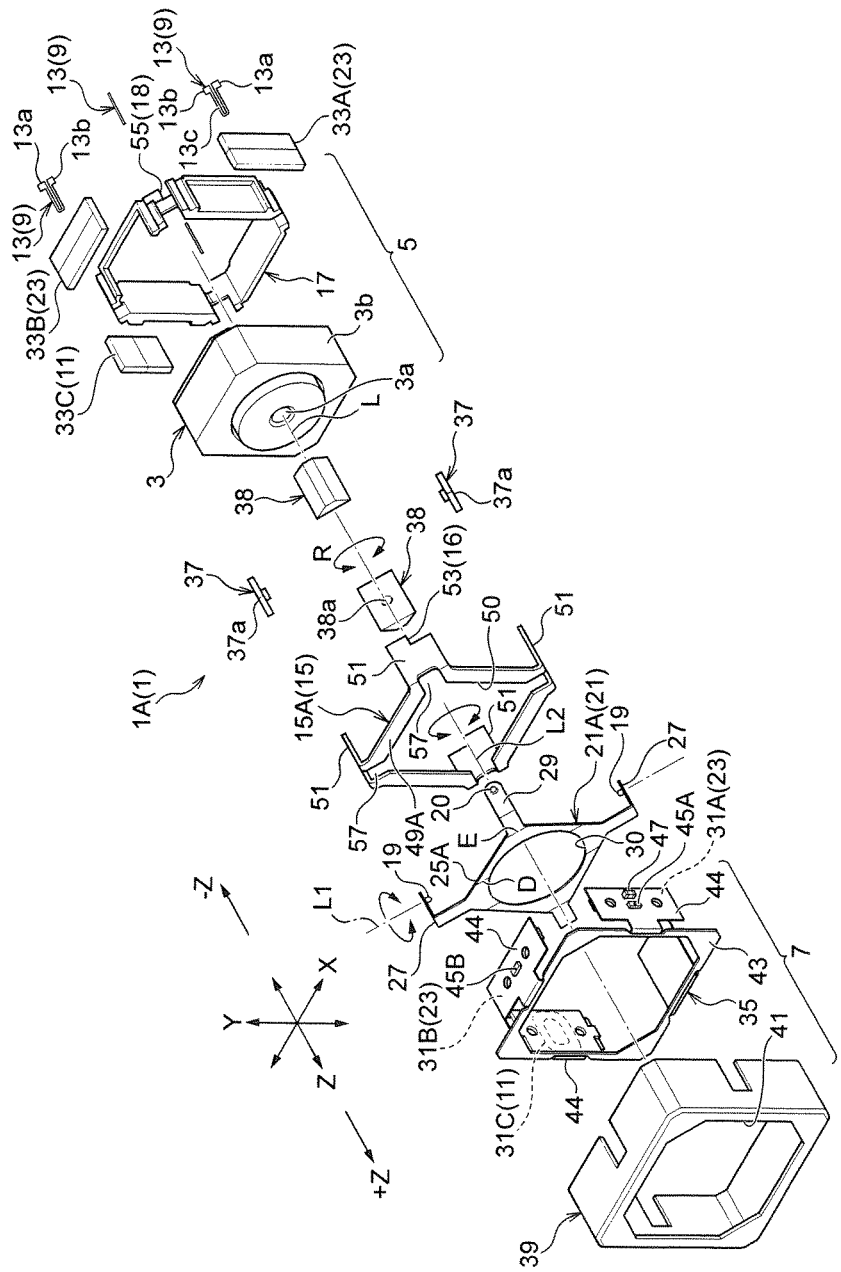
FIG. 5 is a view showing the first embodiment of the present invention and is a perspective view showing the entire optical unit which is disassembled.
Figure 6:
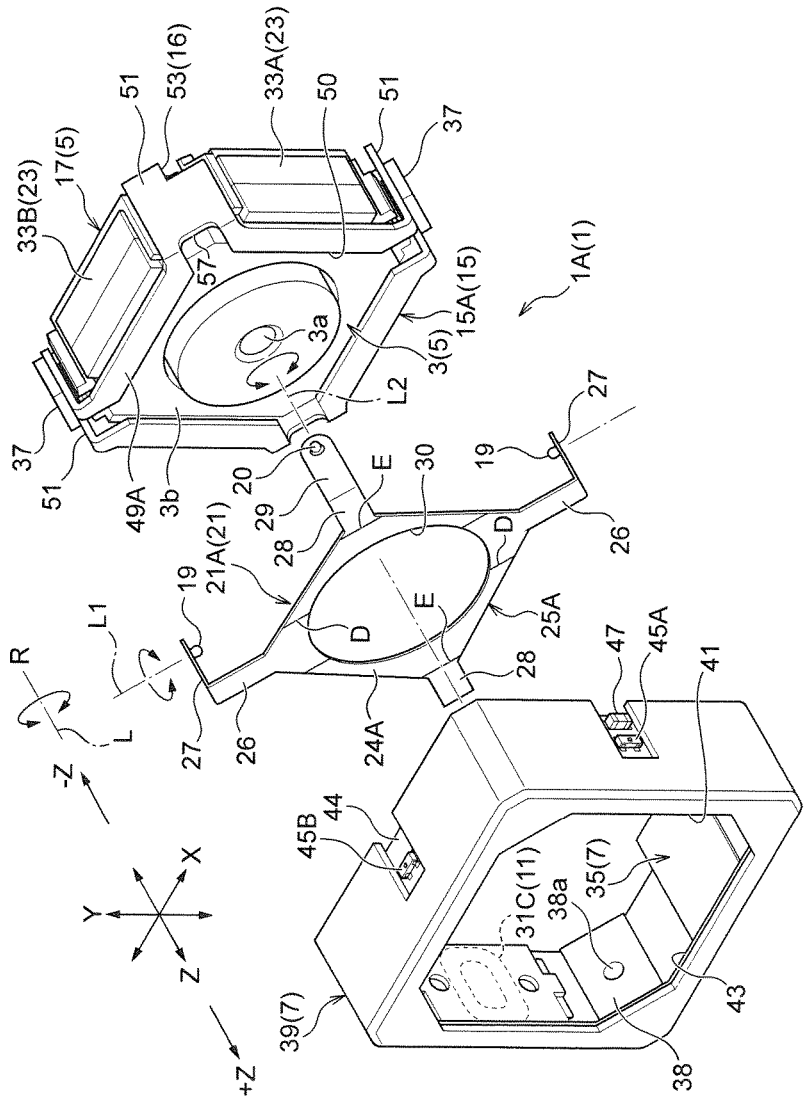
FIG. 6 is a view showing the first embodiment of the present invention and is a perspective view showing the optical unit which is disassembled to a fixed body, a gimbal mechanism and a movable body.
Figure 7:
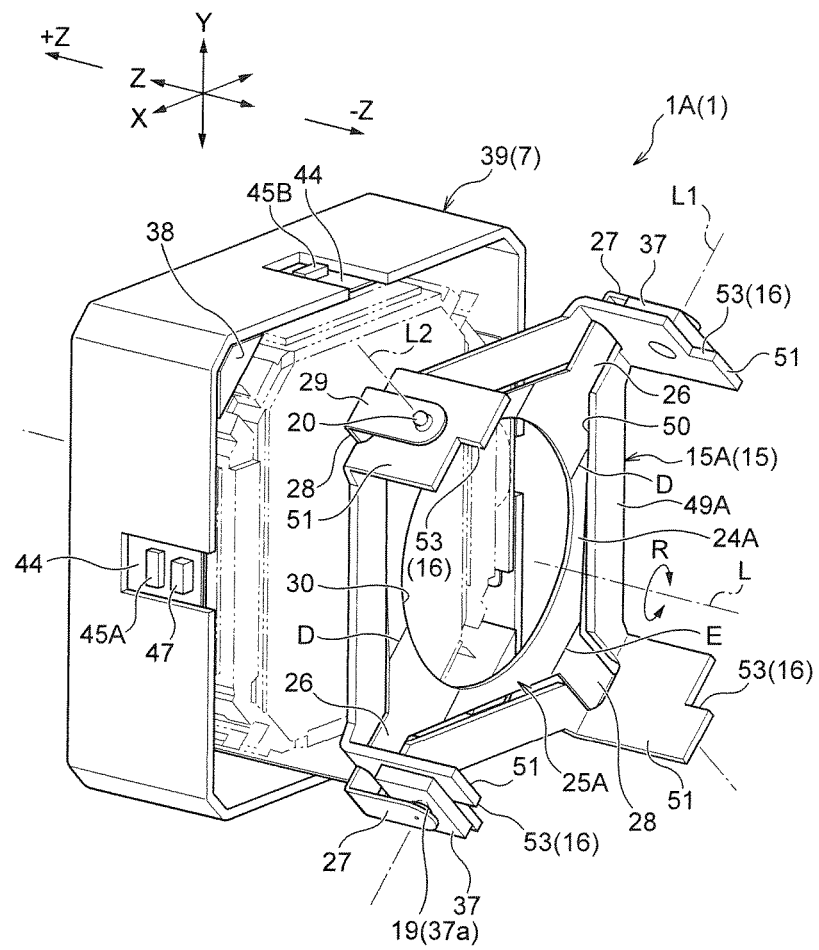
FIG. 7 is a view showing the first embodiment of the present invention and is a perspective view showing the optical unit which is disassembled to a fixed body and a set of a gimbal mechanism and an intermediate frame body and is viewed from an obliquely rear side.

In addition, in the first embodiment, the rolling drive mechanism 11 and the shake correction drive mechanism 23 is structured of sets of coils 31A, 31B and 31C and magnets 33A, 33B and 33C, and a coil attaching frame 35 for attaching the coils 31A, 31B and 31C is provided. Further, the magnets 33A, 33B and 33C are attached to a holder frame 17 (FIG. 5 and FIG. 6).

In addition, in the first embodiment, a first bearing member 37 which receives and engages with the first support part 19 is provided in the intermediate frame body 15A. In addition, a second bearing member 38 which receives and engages with the second support part 20 is provided on an inner face side of each of a pair of corner parts of an outer casing 39 of the fixed body 7.

(2) Specific Structure of Optical Unit (See FIG. 1 Through FIG. 12)

The optical unit 1A in accordance with the first embodiment is an optical unit provided with correcting functions of pitching (vertical swing), yawing (lateral swing) and rolling (swing around the optical axis "L") of the optical module 3. The optical module 3 is, for example, used as a thin camera or the like which is mounted on a cellular phone with a camera, a tablet type personal computer or the like.

An actuator portion which holds the optical module 3 and is structured to perform corrections in the pitching direction "Y", the yawing direction "X" and the rolling direction "R" generated in the optical module 3 is a principal structure of the optical unit 1A. A specific structure of the optical unit 1A will be described in detail below.

<Movable Body>

The movable body 5 is, as shown in FIG. 5 and FIG. 6, structured as an example so as to have the optical module 3 and the holder frame 17 which holds the optical module 3 and to which three magnets 33A, 33B and 33C for pitching, yawing and rolling detection and correction are attached.

The optical module 3 includes a lens 3*a* on the object side "+Z" and an optical device and the like for capturing an image are incorporated in an inside of a rectangular case-shaped housing 3*b*. The holder frame 17 is a rectangular frame-shaped member which is provided so as to surround remaining four faces except a front face where the lens 3*a* of the optical module 3 is provided and a rear face on the opposite side. Two magnets 33A and 33B for pitching and yawing detection and correction and one magnet 33C for rolling detection and correction are attached to outer face sides of the holder frame 17 by utilizing three faces of the holder frame 17.

<Fixed Body>

The fixed body 7 is, as shown in FIG. 5 and FIG. 6, structured as an example so as to have the outer casing 39, a coil attaching frame 35 which is assembled in an inside of the outer casing 39 and to which three coils 31A, 31B and 31C for pitching, yawing and rolling corrections are attached, and second bearing members 38 which are attached to inner faces of corner parts in the second axial line "L2" direction of the outer casing 39.

The outer casing 39 is structured so that a window part 41 is provided in a front face on the object side "+Z" and its rear face on an opposite side "−Z" to an object to be photographed is opened. The outer casing 39 is a rectangular container-shaped member slightly larger than the optical module 3.

<Coil Attaching Frame>

The coil attaching frame 35 is provided with a flat plate part 43 in a rectangular frame shape whose center part is opened on the object side "+Z" and is structured so that three sides of the flat plate part 43 are formed with three coil attaching plates 44 which are bent by 90° to the opposite side "−Z" to an object to be photographed along the optical axis direction "Z".

Inner faces of these three coil attaching plates 44 are respectively attached with two coils 31A and 31B for pitching correction and yawing correction and one coil 31C for rolling correction.

<Shake Correction Drive Mechanism and Rolling Drive Mechanism>

The shake correction drive mechanism 23 is structured of a pair of the correction coil 31A and the magnet 33A and a pair of the correction coil 31B and the magnet 33B for correcting a posture of the movable body 5. Pitching and yawing corrections of the movable body 5 are performed by the pairs of the correction coils 31A and 31B and the magnets 33A and 33B.

The rolling drive mechanism 11 is structured of a pair of the correction coil 31C for rolling and the magnet 33C for rolling detection and correction.

The shake correction drive mechanism 23 and the rolling drive mechanism 11 operate so as to correct shakes based on detection results of the shakes of the optical unit 1A as described below. In other words, electric currents are supplied to the respective coils 31A, 31B and 31C so as to move the movable body 5 in directions for canceling the shakes of the optical unit 1A.

In the first embodiment, a patterned circuit board (coil circuit board) is adopted in which the coils 31A, 31B and 31C are incorporated into a wiring substrate as patterns. In accordance with an embodiment of the present invention, winding coils may be used as the coils 31A, 31B and 31C instead of such a patterned circuit board.

<Shake Detection of Optical Unit>

Three magnetic sensors (Hall element) 45A, 45B and 45C for detecting a variation of magnetic flux density are respectively provided in the vicinities of the three coils 31A, 31B and 31C.

The magnetic sensors (Hall element) 45A, 45B and 45C are paired with the magnets 33A, 33B and 33C for pitching, yawing and rolling detection and correction, and a shake of the movable body 5 having the optical module in the optical unit is detected based on a variation of the magnetic flux density of each of the magnets 33A, 33B and 33C. The shake correction drive mechanism 23 and the rolling drive mechanism 11 are operated so as to correct the shake based on the detected result.

A thermistor 47 is provided near the magnetic sensor 45A which is provided in the vicinity of the coil 31A, and the thermistor 47 is used to detect temperature change of the coil 31A and is utilized in correction of detection values of the respective magnetic sensors 45A, 45B and 45C based on the detected temperature change.

Further, the second bearing member 38 is a block-shaped member which is long in the optical axis direction "Z" and whose cross section is a trapezoid shape, and its inner face is formed with a recessed part 38a which receives and engages with the second support part 20.

<Intermediate Frame Body>

The intermediate frame body 15A is a member which is provided so as to surround the holder frame 17 from the object side "+Z" and is formed by bending a flat plate made of metal (FIG. 6).

The intermediate frame body 15A is provided on the object side "+Z" with a flat plate part 49A in a rectangular frame shape having an opening part 50 which is formed by largely opening its center part in a rectangular shape. The intermediate frame body 15A is structured so that four side plate parts 51 which are bent by 90° to the opposite side "−Z" to an object to be photographed along the optical axis direction "Z" are provided at corner parts of the flat plate part 49A.

Figure 11:
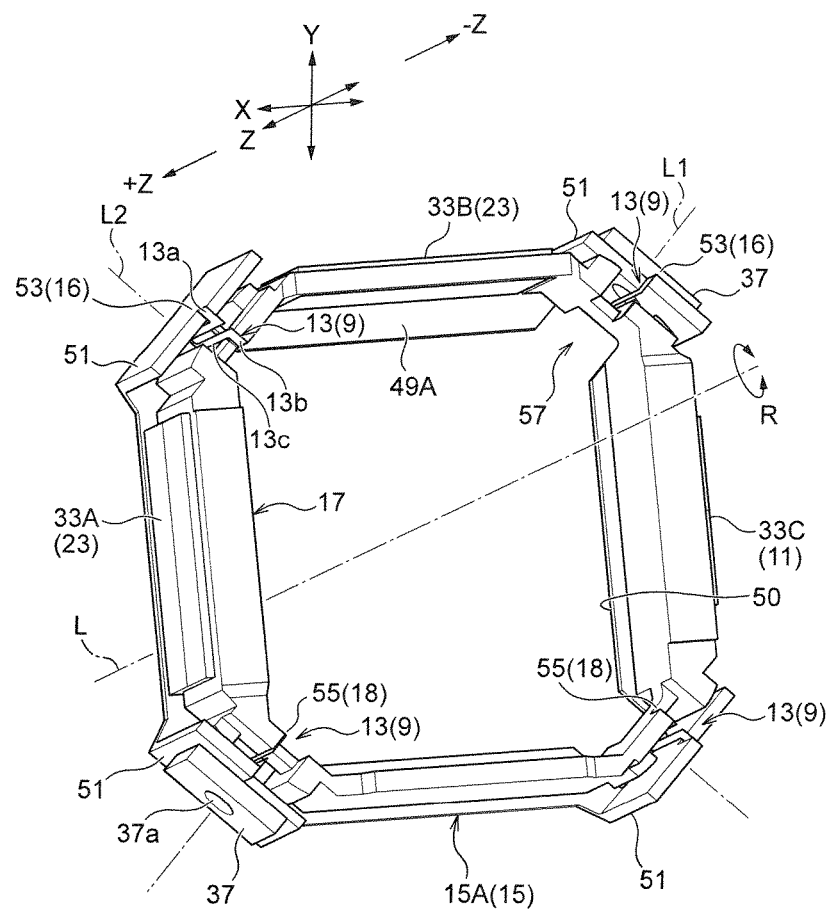
FIG. 11 is a view showing the first embodiment of the present invention and is a perspective view showing an intermediate frame body, a holder frame, an elastic member and a first bearing part of the optical unit and is viewed from an obliquely rear side.
Figure 12:
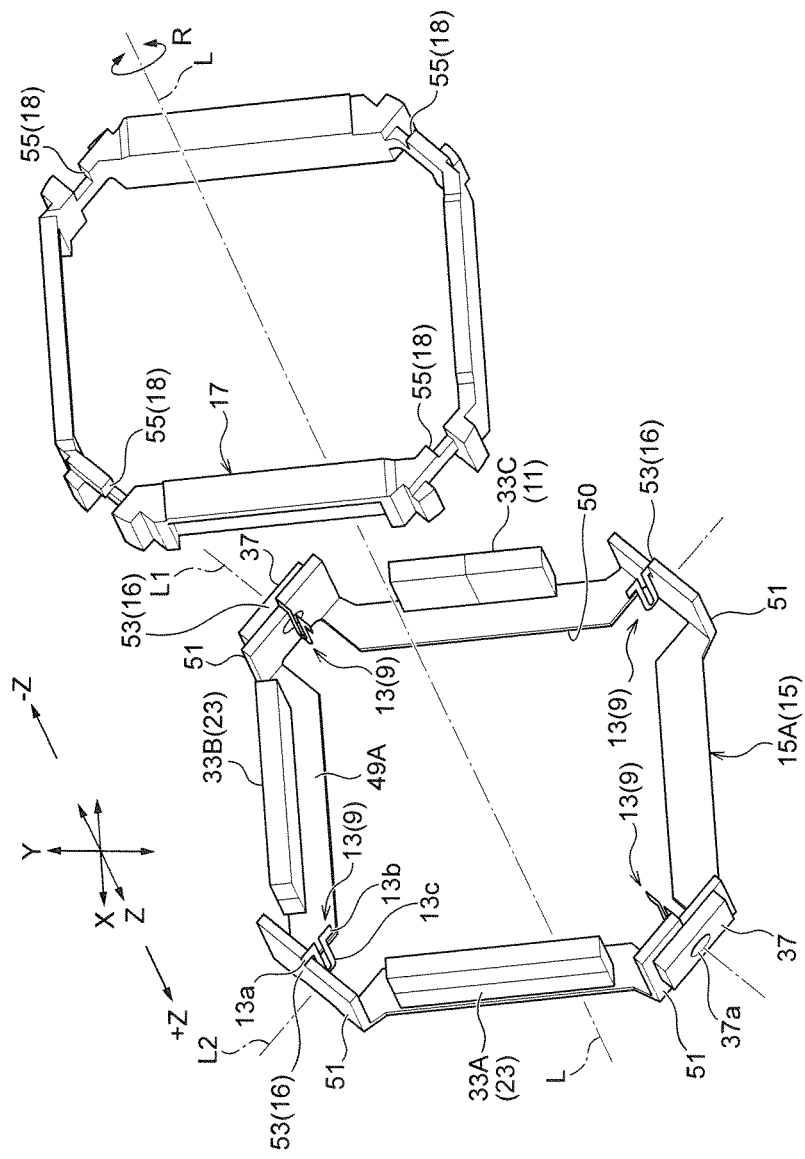
FIG. 12 is a view showing the first embodiment of the present invention and is an exploded perspective view showing an intermediate frame body, a holder frame, an elastic member and a first bearing part of the optical unit and is viewed from an obliquely rear side.
Figure 13:
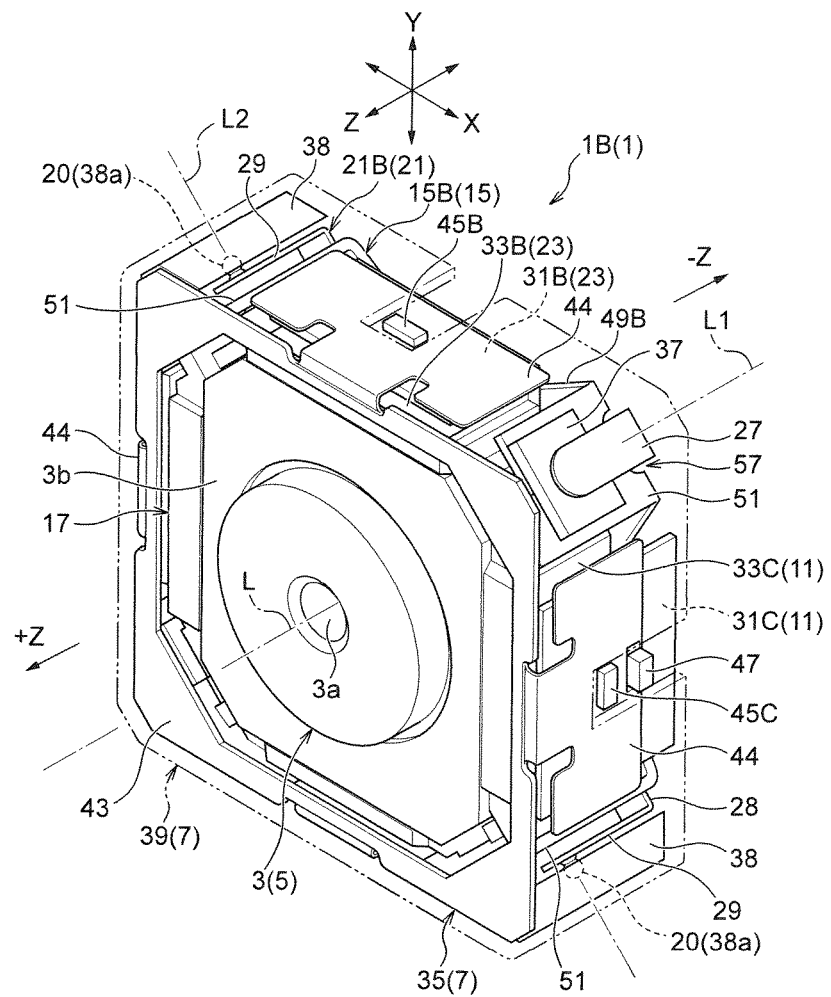
FIG. 13 is a view showing a second embodiment of the present invention and is a perspective view showing an optical unit in which an outer casing is indicated in a transparent manner.
Figure 14:
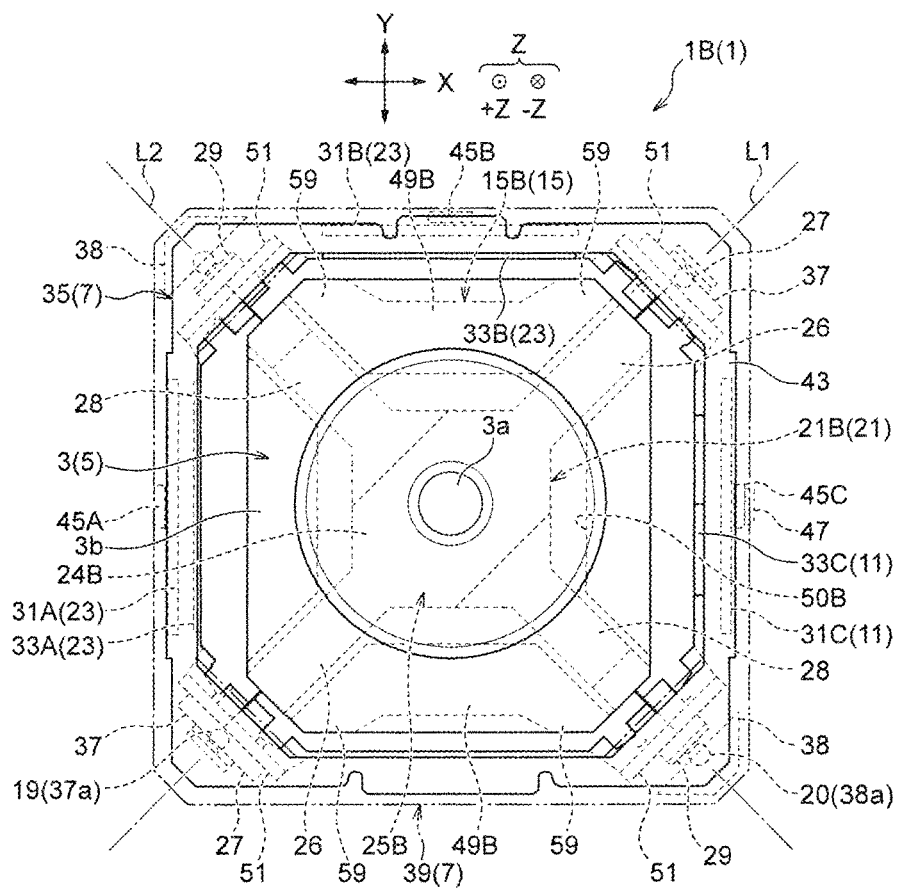
FIG. 14 is a view showing the second embodiment of the present invention and is a front view showing the optical unit in which the outer casing is indicated in a transparent manner.
Figure 15:
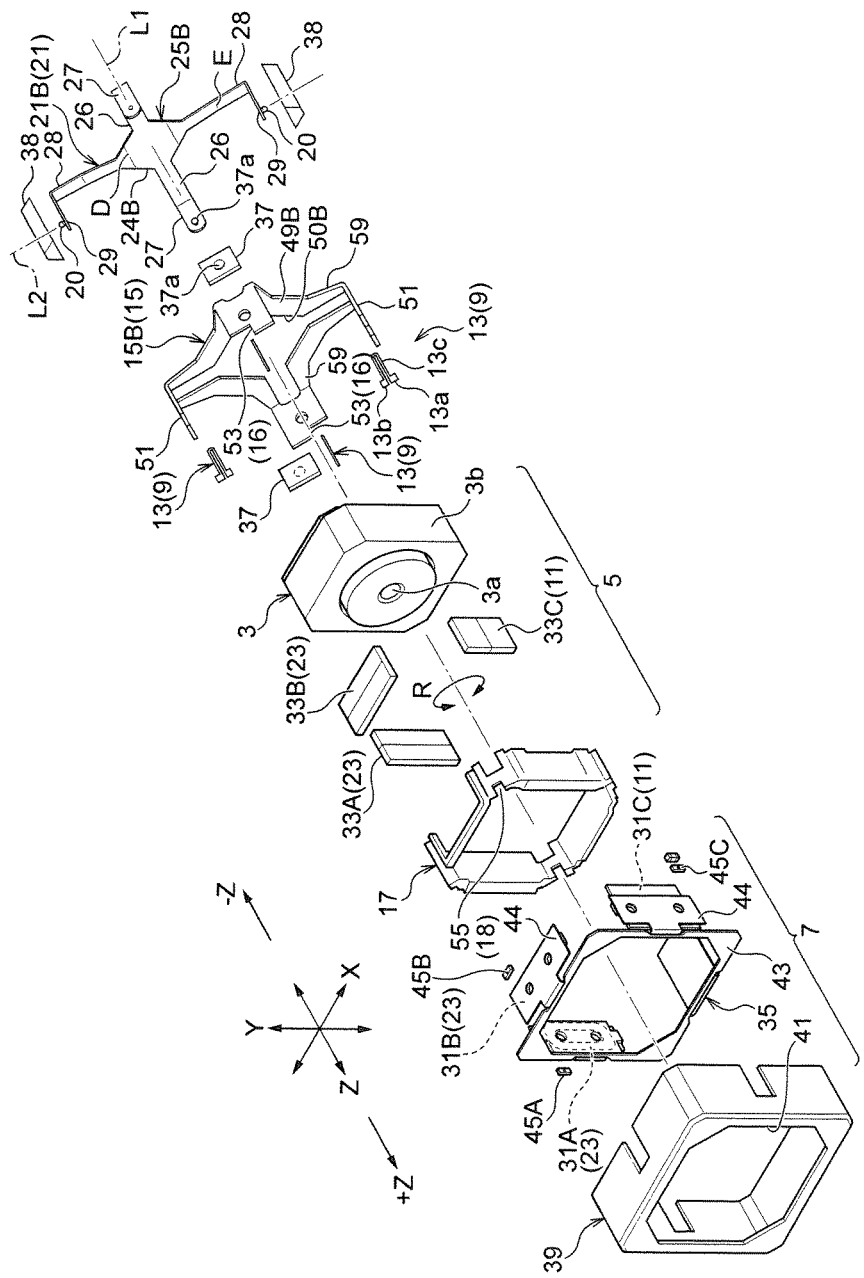
FIG. 15 is a view showing the second embodiment of the present invention and is a perspective view showing the entire optical unit which is disassembled.
Figure 16:
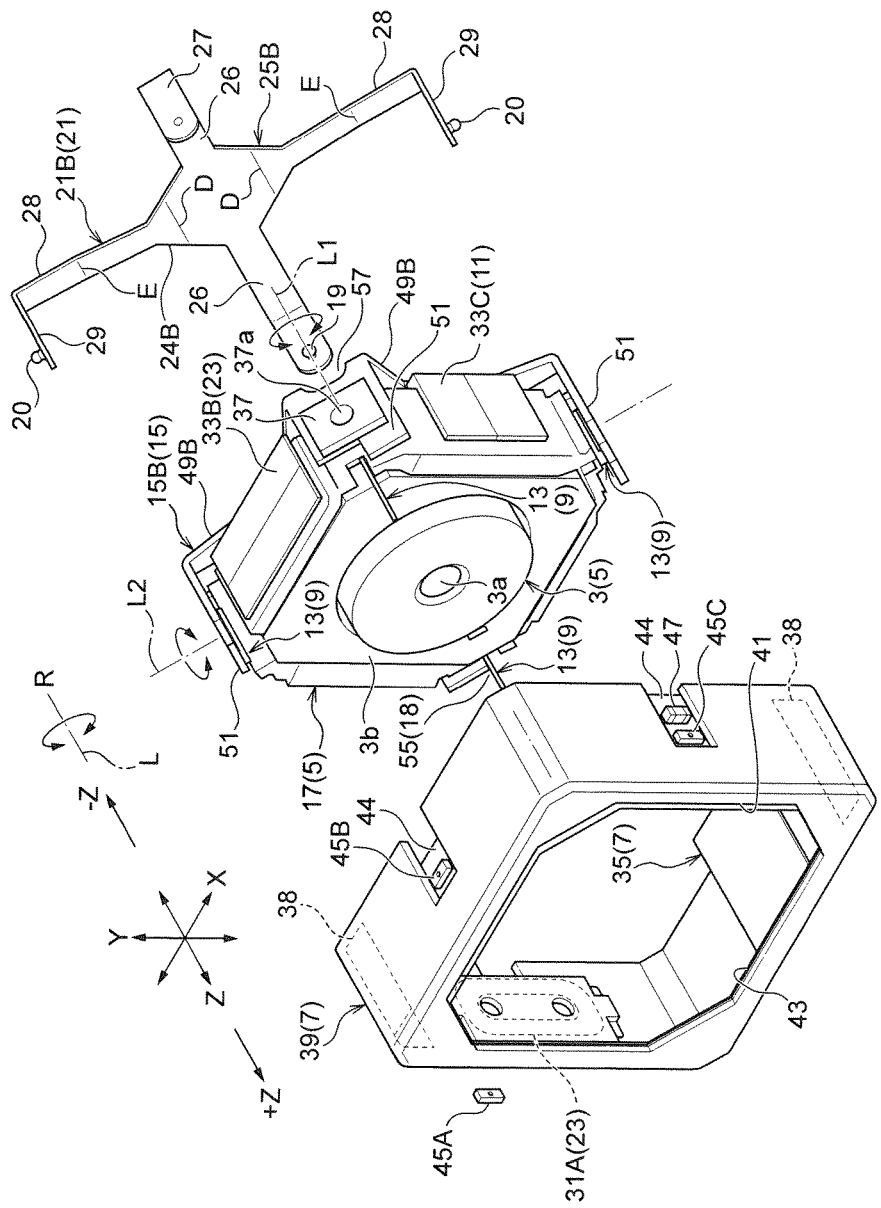
FIG. 16 is a view showing the second embodiment of the present invention and is a perspective view showing the optical unit which is disassembled to a fixed body, a movable body and a gimbal mechanism.
Figure 17:
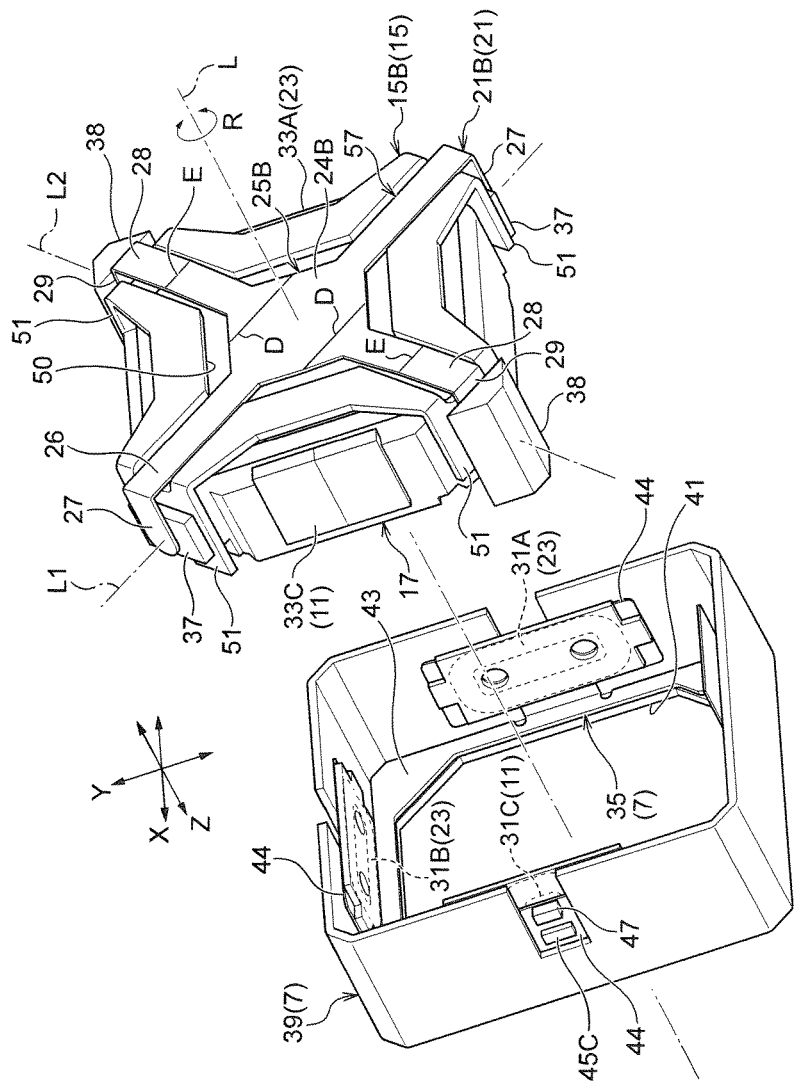
FIG. 17 is a view showing the second embodiment of the present invention and is a perspective view showing a fixed body and a movable body of the optical unit which is disassembled and is viewed from an obliquely rear side.

Further, a part of a tip end of each of the four side plate parts 51 is cut out in a rectangular shape, and the holder frame 17 is also formed with cut-out parts 55 at positions corresponding to the cut-out parts 53 of the four side plate parts 51 in an assembled state (FIG. 5 and FIG. 11).

Four cut-out parts 53 formed at the tip ends of the four side plate parts 51 of the intermediate frame body 15A are used as first fixed parts 16, and four corresponding cut-out parts 55 of the holder frame 17 are used as second fixed parts 18. Therefore, it is structured so that one end part 13a of the elastic member 13 structured of a plate spring is engaged and fixed to the cut-out part 53.

In the first embodiment, one end part 13a and the other end part 13b of the elastic member 13 are, as an example, formed in a rectangle plate shape. However, one end part 13a and the other end part 13b may be formed in other various shapes such as a circular plate shape, a spherical body shape and a bar shape.

Further, in the four side plate parts 51, an outer face of each of the side plate parts 51 located in the first axial line "L1" direction is, as an example, attached with the first bearing member 37 in a rectangular flat plate shape. A further outer face of the first bearing member 37 is formed with a recessed part 37a which receives and engages with the first support part 19.

In addition, cut-out parts 57 are also provided in portions of the intermediate frame body 15A from four corner parts of the flat plate part 49A to root parts of the four side plate parts 51. These cut-out parts 57 are provided for securing a required swing angle (±6° to 10° as an example) of the gimbal mechanism 21A described below around the first axial line "L1" and around the second axial line "L2".

<Elastic Member>

The elastic member 13 is disposed at least three positions which are obtained by equally dividing the circumference "C" (FIG. 8) having a predetermined radius with the optical axis "L" as a center. In this embodiment, as shown in FIG. 5 and FIG. 11, four elastic members 13 structured of a plate spring made of metal are, as an example, provided at four positions obtained by dividing the circumference "C" into four by 90° with the optical axis "L" as a center.

In this case, the above-mentioned "equally dividing" does not mean to divide strictly equally, and it may include a case that the circumference "C" is divided substantially equally.

Further, the plate spring 13 is disposed so that, in a state that the plate spring 13 is fixed to the first fixed part 16 and the second fixed part 18 and is assembled between the intermediate frame body 15A and the holder frame 17, a direction of the plate thickness of the plate spring 13 is directed in a turning direction of the movable body 5 around the optical axis "L", in other words, in the rolling direction "R".

In this embodiment, in the above-mentioned expression that "a direction of the plate thickness of the plate spring 13 is directed in a turning direction of the movable body 5 around the optical axis "L", in other words, in the rolling direction "R", the phrase "the direction is directed in the rolling direction "R" does not mean in this specification that a direction of the plate thickness of the plate spring 13 is strictly and precisely directed in the rolling direction "R" which is always changed. Specifically, the direction may vary in a range that a function for turnably supporting the optical module 3 around the optical axis "L" does not become unstable, and the direction of the plate thickness may be inclined with respect to the rolling direction "R" to some extent within an allowable range.

Further, as shown in FIG. 6 through FIG. 10, the plate spring 13 is formed so that a first length "A" in the direction "Z" along the optical axis is larger than a second length "B" in a radial direction intersecting the optical axis "L". In the embodiment shown in the drawings, the first length "A" is set to a length of three or four times of the second length "B".

Further, in the first embodiment, a freely bendable part 13c between one end part 13a of the plate spring 13 and the other end part 13b is formed in a "U"-shape as an example. In the freely bendable part 13c, the first length "A" is set to be long as described above and thus, the plate spring 13 can be smoothly bent and deformed and rigidity against movement in the optical axis direction "Z" is increased.

Further, the second length "B" of the plate spring 13 is also set to be wider than the plate thickness of the plate spring 13, and rigidity against movement in the radial direction which is a width direction of the spring is increased.

In this embodiment, a shape of the freely bendable part 13c of the plate spring 13 may be set in other shapes such as a "V"-shape, "I"-shape or "N"-shape in addition to the "U"-shape as shown in the drawing of the embodiment. In a case of an "I"-shape or an "N"-shape, the positions of one end part 13a and the other end part 13b are located on opposite sides to each other in a direction along the optical axis (direction of the first length "A").

<Gimbal Mechanism>

Figure 9:
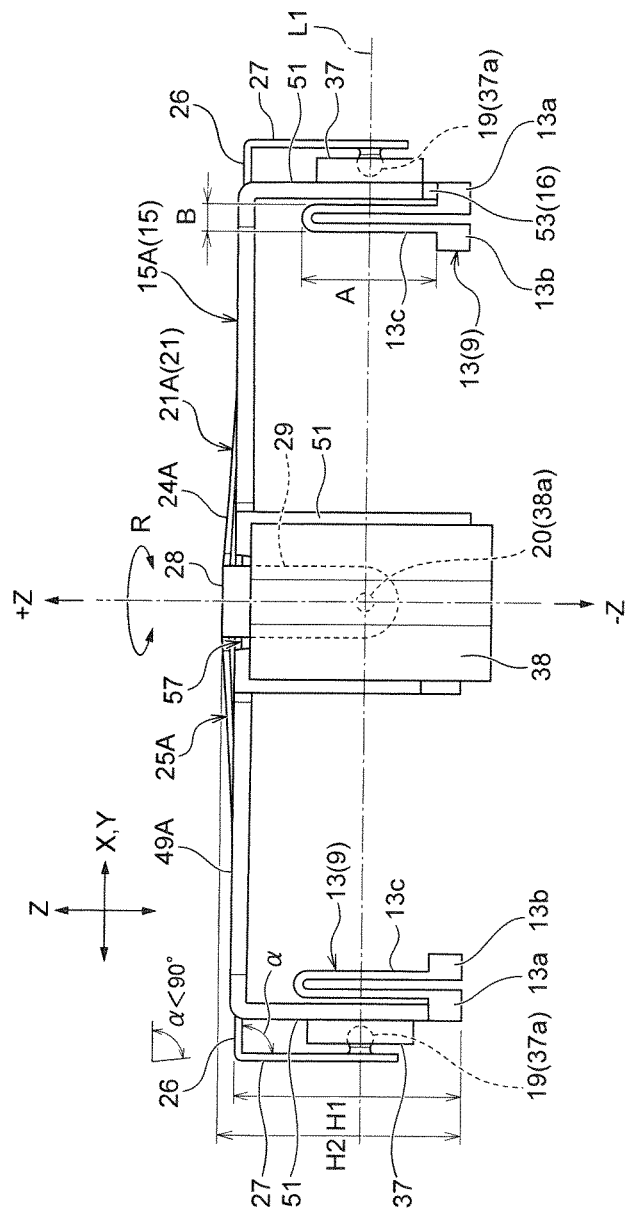
FIG. 9 is a view showing the first embodiment of the present invention and is a view showing a gimbal mechanism, an intermediate frame body, a first bearing part, a second bearing part and an elastic member of the optical unit which is viewed in a direction of the arrow "B" in FIG. 2.
Figure 10:
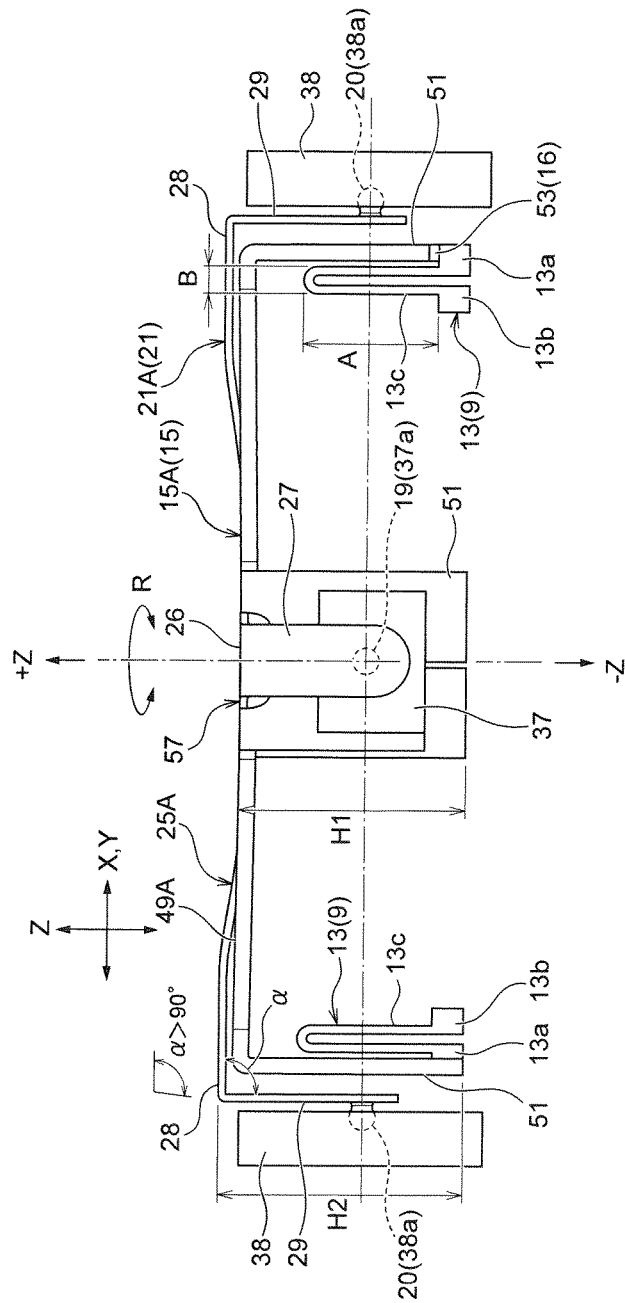
FIG. 10 is a view showing the first embodiment of the present invention and is a view showing a gimbal mechanism, an intermediate frame body, a first bearing part, a second bearing part and an elastic member of the optical unit which is viewed in a direction of the arrow "A" in FIG. 2.

As shown in FIG. 6 through FIG. 10, the gimbal mechanism 21A is a mechanism which is provided with a spring property formed by bending a flat plate member made of metal. Specifically, the gimbal mechanism 21A is, as shown in FIG. 9 and FIG. 10, structured of, as an example, the gimbal frame part 25A provided on the object side "+Z", and first support part extended parts 27 and second support part extended parts 29, which are formed by bending by 90° in the optical axis direction "Z" from four corner parts of the gimbal frame part 25A.

In this case, the entire first support part extended part 27 and the entire second support part extended part 29 are not always required to be a plate shape, and it may be structured that only a part of the extended part is formed in a plate shape to provide a spring property. Further, one of the first support part extended part 27 and the second support part extended part 29 may be formed in another shape except a plate shape (for example, rod shape).

Further, the first support part 19 is provided on an inner side face of the first support part extended part 27 which faces the movable body 5. The first support part 19 is structured of a member made of metal, and a portion of the first support part 19 which contacts and supports the recessed part 37a formed in a concave spherical surface shape of the first bearing member 37 which is a member of the movable body 5 is formed in a convex curved face. The first support part 19 is, as an example, structured of a protruded part formed in the first support part extended part 27 by press working or the like. Alternatively, the first support part 19 is attached to the first support part extended part 27 by directly welding.

Further, the second support part 20 is provided on an outer side face of the second support part extended part 29 which faces the fixed body 7. The second support part 20 is structured of a member made of metal, and a portion of the second support part 20 which contacts and supports the recessed part 38a formed in a concave spherical surface shape of the second bearing member 38 which is a member of the fixed body 7 is formed in a convex curved face. The second support part 20 is, as an example, structured of a protruded part formed in the second support part extended part 29 by press working or the like. Alternatively, the second support part 20 is attached to the second support part extended part 29 by directly welding.

Further, as shown in FIG. 9 and FIG. 10, in a separated state of the gimbal frame part 25A, in the first embodiment, an extended angle "a" of the first support part extended part 27 with respect to the gimbal frame part 25A is set to an angle which is displaced to an inner side ($\alpha$<90°) so as to elastically contact with the first bearing member 37 which is a member of the movable body 5 (FIG. 9).

Further, in the separated state of the gimbal frame part 25A, in the first embodiment, an extended angle "$\alpha$" of the second support part extended part 29 with respect to the gimbal frame part 25A is set to an angle which is displaced to an outer side ($\alpha$>90°) so as to elastically contact with the second bearing member 38 which is a member of the fixed body 7 (FIG. 10).

As a result, the first support part 19 is elastically contacted with the first bearing member 37 and the second support part 20 is elastically contacted with the second bearing member 38. In other words, both of the first support part 19 and the second support part are elastically contacted and thus, pressurization is applied to the point contact parts of both of the first support part 19 and the second support part 20 and, as a result, strong support and smooth swinging which has less possibility of coming off can be attained.

The gimbal frame part 25A is provided with a base frame 24A formed in a rectangular frame shape whose center is formed with a circular opening part 30, and first extended parts 26 extended in the first axial line "L1" direction and second extended parts 28 extended in the second axial line "L2" direction from four corner parts of the base frame 24A with the optical axis "L" as a center. Therefore, the gimbal frame part 25A is formed in an "X"-shape.

Further, the gimbal mechanism 21A is formed by using a metal plate in the first embodiment, and the first extended parts 26 and the second extended parts 28 of the gimbal frame part 25A formed in an "X"-shape are formed to be long in the extended direction, and the first support part extended parts 27 and the second support part extended parts 29 are formed by bending tip end parts of the first extended parts 26 and the second extended parts 28.

Further, as shown in FIG. 6 and FIG. 8, in the gimbal frame part 25A, a gap space between the second extended part 28 and the movable body 5 is formed larger than a gap space between the first extended part 26 and the movable body 5. In other words, the gimbal frame part 25A is formed to be bent at bending lines "D" and "E" so that a height "H1" in the optical axis direction "Z" of the tip end part of the first extended part 26 is lower than a height "H2" in the optical axis direction "Z" of the tip end part of the second extended part 28, in other words, the height "H1" is located at a closer position to the movable body 5 than the height "H2".

As a result, a movable region (movable gap) on the object side "+Z" in the optical axis direction "Z" which is formed at the tip end of the first extended part 26 becomes large and thus, a movable gap of the movable body 5 in the optical axis direction "Z" can be provided easily.

The structure of the optical unit 1A in accordance with the first embodiment has been described above and the specific structures will be described below in an organized manner.

The intermediate frame body 15 which connects the movable body 5 and the fixed body 7 with each other in a state that movement of the movable body 5 in a rolling direction is permitted is provided between the movable body 5 and the fixed body 7.

The movable body 5 includes the holder frame 17 which has the optical module 3 and to which the magnets 33A, 33B and 33C for pitching, yawing and rolling detections and corrections are attached.

The fixed body 7 includes the outer casing 39, the coil attaching frame 35 which is assembled in an inside of the outer casing 39 and to which the coils 31A, 31B and 31C for pitching, yawing and rolling corrections are attached, and the second bearing members 38 which are attached to inner faces of the corner parts in the second axial line "L2" direction of the outer casing 39 and by which the second support parts 20 of the gimbal mechanism 21 are supported.

The intermediate frame body 15 includes the first bearing members 37 by which the first support parts 19 of the gimbal mechanism 21 are supported.

The coil attaching frame 35 includes the magnetic sensors (Hall element) 45A, 45B and 45C structured to detect a shake of hand of the optical unit 1A based on variations of the magnetic flux densities of the paired magnets 33A, 33B and 33C for pitching, yawing and rolling detection and correction.

Further, the elastic members 13 are disposed between the holder frame 17 and the intermediate frame body 15.

According to the above-mentioned structures, the optical unit 1A which is capable of performing pitching correction, yawing correction and rolling correction of the optical module 3 can be compactly and easily manufactured by efficiently arranging components and by adopting the novel gimbal mechanism 21 and the elastic members 13.

(3) Operation Mode of Optical Unit

Next, an operation mode of the optical unit 1A in accordance with the first embodiment structured as described above will be described below by dividing pitching and yawing correction and rolling correction.

(A) Pitching and Yawing Correction

When a shake occurs in both directions or in either direction of the pitching direction "Y" and the yawing direction "X" in the optical unit 1A, the shake is detected by a shake detection sensor (gyroscope) not shown and the shake correction drive mechanism 23 is driven based on the result. Alternatively, a shake of the optical unit 1A may be detected based on variations of the magnetic flux densities by the magnetic sensors (Hall element) 45A and 45B and the paired magnets 33A and 33B for pitching and yawing detection and correction.

The shake correction drive mechanism 23 is operated based on the detected result of the shake so as to correct the shake. In other words, electric currents are supplied to the respective coils 31A and 31B so as to move the movable body 5 in a direction canceling the shake of the optical unit 1A and thereby the shake is corrected.

(B) Rolling Correction

When a shake occurs in the optical unit 1A in the rolling "R" direction, the shake of the optical unit 1A in the rolling "R" direction is detected by the magnetic sensor (Hall element) 45C and the paired magnet 33C for rolling detection and correction based on variation of the magnetic flux density.

The rolling drive mechanism 11 is operated so as to correct the shake based on the detected result of the shake. In other words, an electric current is supplied to the coil 31C so as to move the movable body 5 in a direction canceling the shake of the optical unit 1A and thereby the shake in the rolling "R" direction is corrected.

A drive source for performing a correcting operation of a shake is not limited to a voice coil motor which is structured of respective pairs of the coils 31A, 31B and 31C with the magnets 33A, 33B and 33C like the shake correction drive mechanism 23 and the rolling drive mechanism. A stepping motor, a piezo element or the like may be utilized as other drive sources.

After shake corrections in the pitching direction "Y", the yawing direction "X" and the rolling direction "R" have been performed, when electric power to the drive source is stopped, the optical unit 1A is returned to the states at the initial positions where the shake corrections are respectively released by a posture return mechanism by using magnetic springs and spring properties of the elastic members 13.

In this embodiment, although not shown, the posture return mechanism is a structure which utilizes a magnetic attraction force generated between a magnetic body and the magnet separately provided on the fixed body 7 and the movable body 5. The magnetic body and the magnet are disposed so that, when located at the initial position in a posture without a shake, the magnetic attraction force acts so as to hold a posture at the initial position and, when displaced from the initial position due to a shake, the magnetic attraction force acts in a direction so that the posture is returned to the original initial position.

According to the optical unit 1A in accordance with the first embodiment which is structured as described above, a support structure utilizing the elastic member 13 is provided and thus, a support member such as an expensive bearing which is conventionally provided on an opposite side "−Z" to an object to be photographed with respect to the optical module 3 is not required to be used. Further, a space for providing the bearing can be saved and thus, a size of the optical unit 1A in the optical axis direction "Z" can be reduced.

Further, the gimbal mechanism 21A is structured by bending a flat plate member and thus, a space between the optical module 3 and the outer casing 39 can be reduced and, as a result, sizes of the optical unit 1A in the directions "X" and "Y" intersecting the optical axis can be reduced.

In addition, in a case of the first embodiment, when the optical module 3 and the holder frame 17 are to be detached from the fixed body 7, no member which obstructs detachment of these components exists on the opposite side "−Z" to an object to be photographed and thus, only the optical module 3 and the holder frame 17 can be pulled out to the opposite side "−Z" to an object to be photographed. Therefore, maintenance is also excellent.

Further, elastic structures are provided in a bending structure portion between the first extended part 26 and the first support part extended part 27 and in a bending structure portion between the second extended part 28 and the second support part extended part 29 of the gimbal frame part 25A of the gimbal mechanism 21A and thus, an operation and effect is obtained in which the optical module 3 is protected from an external impact (dropping, collision or the like) in the optical axis direction "Z" and a possibility of falling of the optical module 3 from the opposite side "−Z" to an object to be photographed is reduced. In addition, the flat plate part 49A of the intermediate frame body 15A also operates to protect the optical module 3 from an external impact.

Second Embodiment (1) Specific Structure of Optical Unit (see FIG. 13 through FIG. 17)

An optical unit 1B in accordance with a second embodiment of the present invention is an embodiment in which a gimbal frame part 25B of a gimbal mechanism 21B is disposed on the opposite side "−Z" to an object to be photographed in the optical axis direction "Z". Therefore, a flat plate part 49B of an intermediate frame body 15B is also disposed on the opposite side "−Z" to an object to be photographed in the optical axis direction "Z".

Other structures are basically similar to the optical unit 1A in accordance with the first embodiment. Therefore, in the following descriptions, descriptions of similar structures as the first embodiment are omitted, and structure and arrangement of the gimbal mechanism 21B and the intermediate frame body 15B different from the first embodiment will be mainly described.

In other words, in the second embodiment, the gimbal mechanism 21B is, similarly to the first embodiment, formed by bending a flat plate member made of metal. In other words, the gimbal mechanism 21B is structured by providing a gimbal frame part 25B provided on the opposite side "−Z" to an object to be photographed, and first support part extended parts 27 and second support part extended parts 29 which are formed by bending by 90° in the optical axis direction "Z" from four corner parts of the gimbal frame part 25B.

In this case, the gimbal frame part 25B in the second embodiment is provided with no opening part 30 which is provided in the gimbal frame part 25A in the first embodiment. The gimbal frame part 25B is structured so that a size of a base frame 24B is smaller and lengths of the first extended part 26 and the second extended part 28 are longer in comparison with the first embodiment.

Further, in the second embodiment, the intermediate frame body 15B is, similarly to the first embodiment, formed by bending a flat plate member made of metal, and is structured of a flat plate part 49B provided on the opposite side "−Z" to an object to be photographed and four side plate parts 51 formed by bending by 90° in the optical axis direction "Z" from four corner parts of the flat plate part 49B.

In this case, the flat plate part 49B of the intermediate frame body 15B in the second embodiment is formed with an opening part 50B in a rectangular shape at its center part which is one size larger than the base frame 24B of the gimbal frame part 25B. Four corner parts of the flat plate part 49B are formed with extended parts 59 extended in a radial direction with the optical axis "L" as a center, and four side plate parts 51 are formed so as to extend from tip ends of the extended parts 59 toward the object side "+Z".

Further, with the above-mentioned arrangement of the gimbal mechanism 21B and the intermediate frame body 15B, in the second embodiment, cut-out parts 55 formed in the holder frame 17 and cut-out parts 53 formed at tip ends of the side plate parts 51 of the intermediate frame body 15B are located on the object side "+Z", and one end part 13a and the other end part 13b of the elastic member 13 are attached in a state that they are located on the object side "+Z".

(2) Operation Mode of Optical Unit

An operation mode of the optical unit 1B in accordance with the second embodiment structured as described above is basically similar to the operation mode of the optical unit 1A in accordance with the first embodiment. Shake corrections in the pitching direction "Y" and the yawing direction "X" are performed based on variations of relative positions between two magnets 33A and 33B for pitching and yawing detection and correction attached to the holder frame 17 which is integrally moved with the optical module 3 and two coils 31A and 31B for pitching and yawing correction which are attached to the coil attaching frame 35 provided in a fixed state.

Similarly, a shake correction in the rolling direction "R" is performed based on a variation of relative positions between one magnet 33C for rolling detection and correction attached to the holder frame 17 and one coil 31C for rolling correction attached to the coil attaching frame 35.

After shake corrections in the pitching direction "Y" and the yawing direction "X" have been performed, when electric power supplied to the drive source is stopped, the optical unit 1B is returned to the states at the original initial positions by magnetic attraction forces of the posture return mechanism.

Further, after a shake correction in the rolling direction "R" has been performed, when electric power supplied to the drive source is stopped, the elastic members 13 are also returned to their original states by spring properties of the freely bendable parts 13c of the elastic members 13.

Also in the optical unit 1B in accordance with the second embodiment structured as described above, operation and effects similar to the optical unit 1A in the first embodiment are provided and sizes of the optical unit 1B in the optical axis direction "Z" and the directions "X" and "Y" intersecting the optical axis can be reduced.

Further, elastic structures are provided in a bending structure portion between the first extended part 26 and the first support part extended part 27 and in a bending structure portion between the second extended part 28 and the second support part extended part 29 of the gimbal frame part 25B of the gimbal mechanism 21B and thus, an operation and effect is obtained in which the optical module 3 is protected from an external impact (dropping, collision or the like) in the optical axis direction "Z" and a possibility of falling of the optical module 3 from the opposite side "−Z" to an object to be photographed is reduced. In addition, the flat plate part 49B of the intermediate frame body 15B also operates to protect the optical module 3 from an external impact.

[Third Embodiment] (see FIG. 18 Through FIG. 21)

An optical unit 1C in accordance with a third embodiment of the present invention is basically structured similarly to the optical unit 1A in accordance with the first embodiment and, as a structure to further reduce a size of the optical unit 1C in the optical axis direction "Z", the optical unit 1C is an embodiment in which a first retreated part 61 is provided in the gimbal frame part 25 C.

Therefore, in the following descriptions, similar structures to the first embodiment are shown by using the same reference signs in the drawings and their descriptions are omitted, and a structure of the first retreated part 61 which is a specific structure in the third embodiment different from the first embodiment and its operation and effect will be mainly described.

In the third embodiment, the gimbal mechanism 21C is provided with a first retreated part 61 in a portion connected with the first support part extended part 27 of the gimbal frame part 25C so as to lower a height in an extended direction ("Z" direction) of the first support part extended part with respect to a face of the gimbal frame part 25C.

Specifically, a tip end part of the first extended part 26 extended toward an outer side in the first axial line "L1" from the base frame 24C of the gimbal frame part 25C is bent to the opposite side "−Z" to an object to be photographed and is set in an inclined state. As a result, the first retreated part 61 is formed and a position of a connecting portion with the first support part extended part 27 is located on the opposite side "−Z" to an object to be photographed with respect to a face of the gimbal frame part 25C.

Further, in a case that the gimbal frame part 25C is a molded article which is unable to be bent or made of a board member having a large thickness, it may be structured that their corner parts are simply cut obliquely and chamfered to form a substantially octagonal shape when viewed in the optical axis direction "Z" and, in this manner, the first retreated parts 61 are formed.

Figure 18:
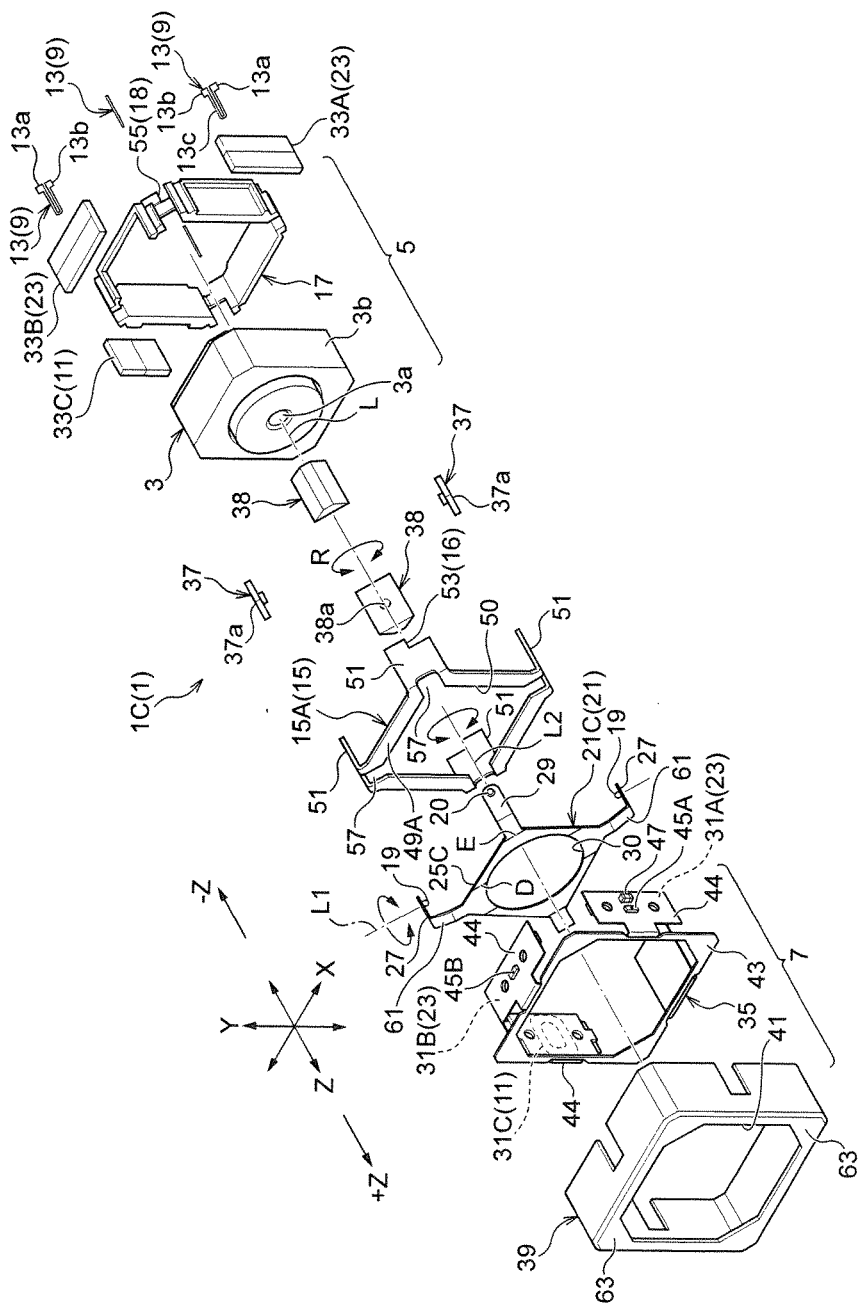
FIG. 18 is a view showing a third embodiment of the present invention and is a perspective view showing an entire optical unit which is disassembled.
Figure 19:
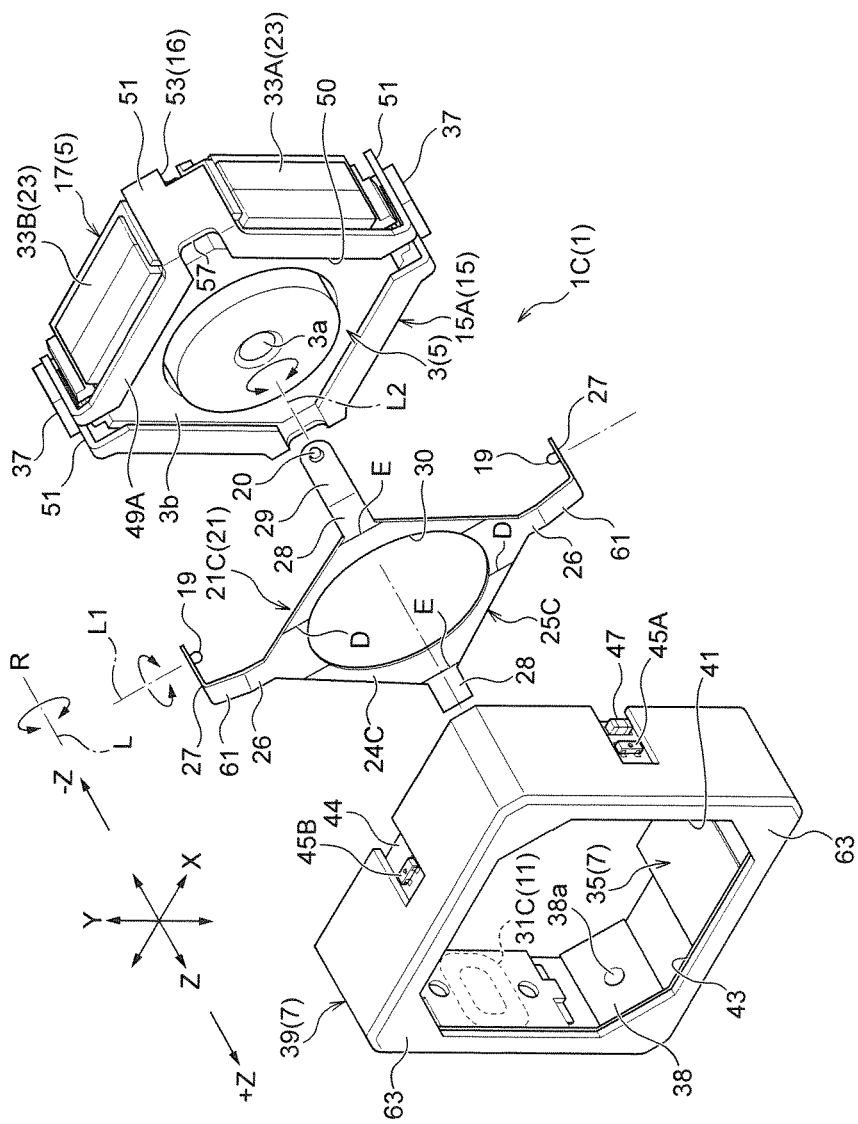
FIG. 19 is a view showing the third embodiment of the present invention and is a perspective view showing the optical unit which is disassembled to a fixed body, a gimbal mechanism and a movable body.
Figure 20:
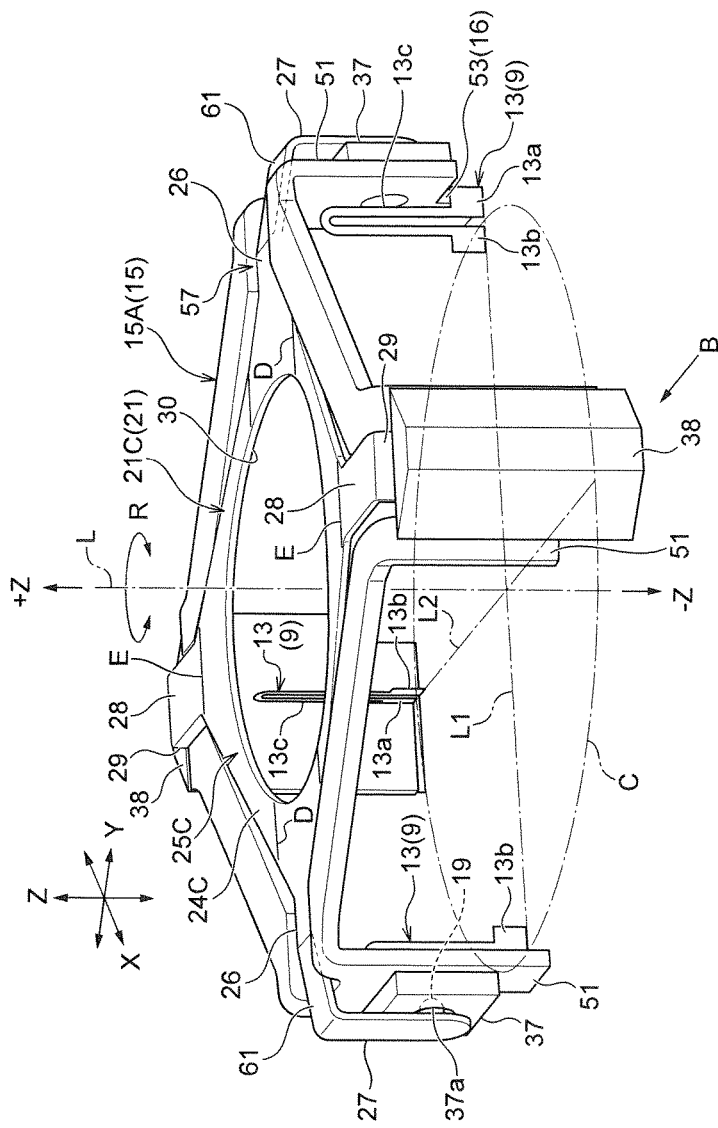
FIG. 20 is a view showing the third embodiment of the present invention and is a perspective view showing a gimbal mechanism, an intermediate frame body, a first bearing part, a second bearing part and an elastic member of the optical unit.
Figure 21:
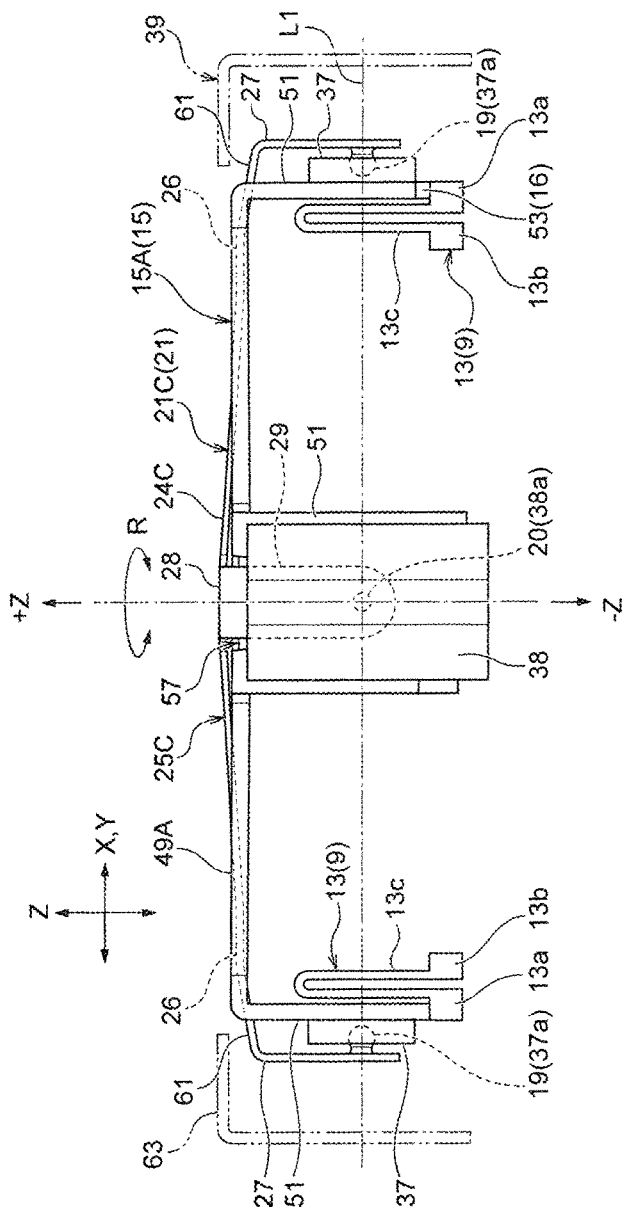
FIG. 21 is a view showing the third embodiment of the present invention and is a view showing a gimbal mechanism, an intermediate frame body, a first bearing part, a second bearing part and an elastic member of the optical unit which is viewed in a direction of the arrow "B" in FIG. 20.
Figure 22:
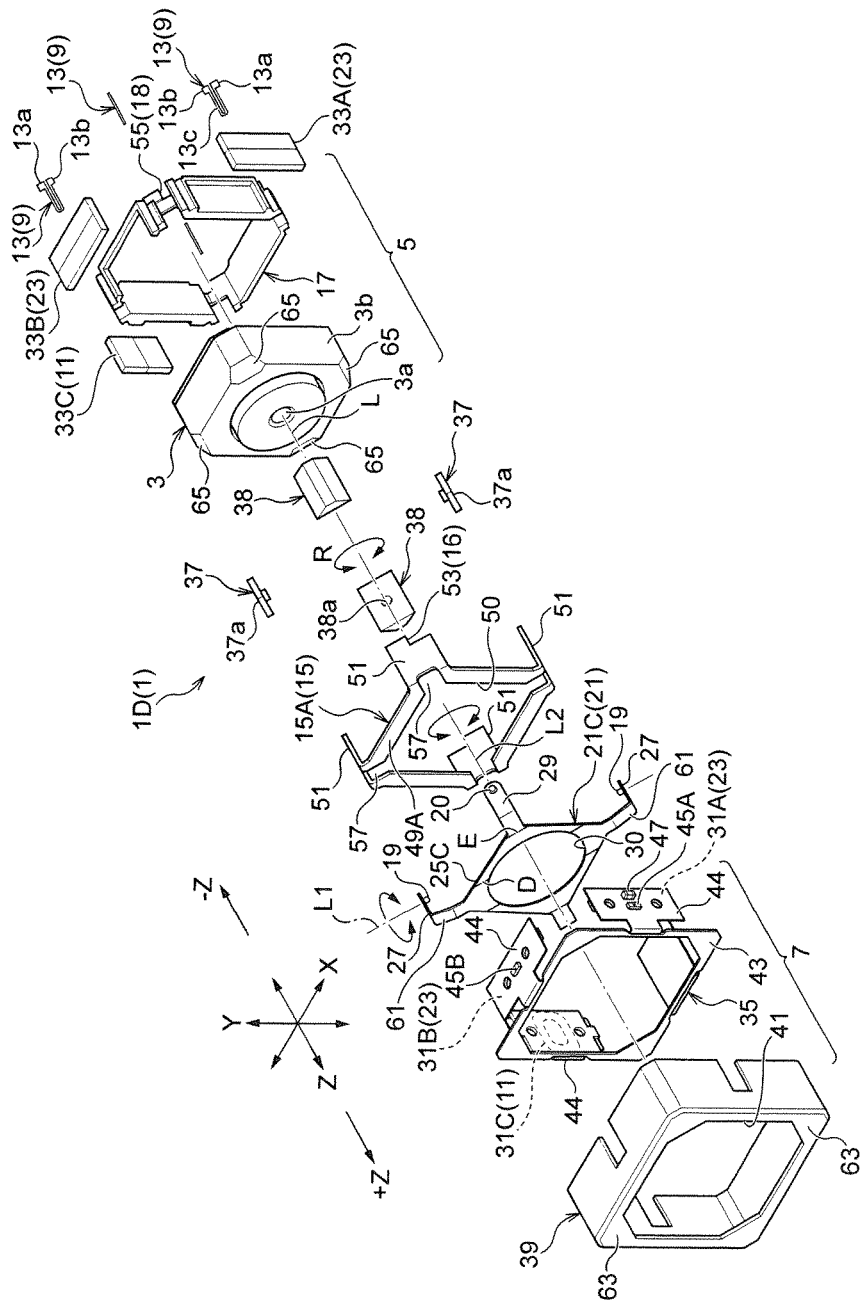
FIG. 22 is a view showing a fourth embodiment of the present invention and is a perspective view showing an entire optical unit which is disassembled.
Figure 23:
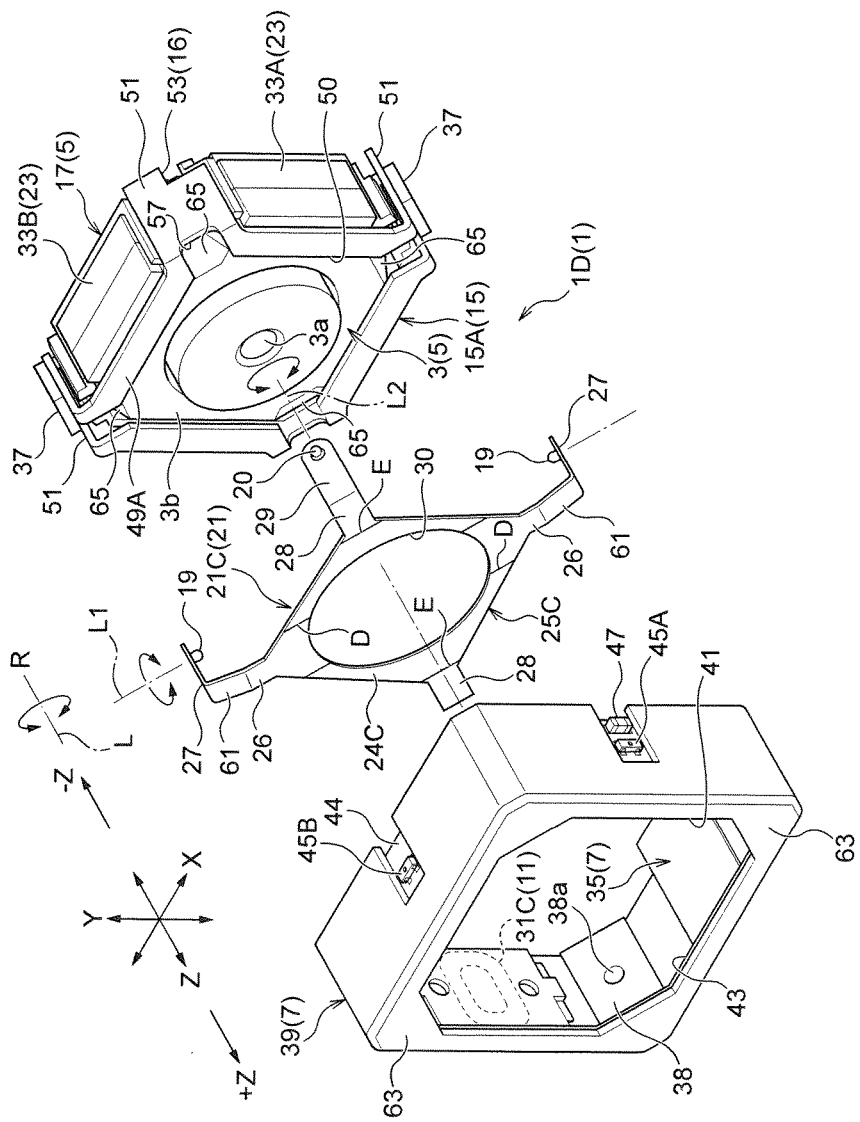
FIG. 23 is a view showing the fourth embodiment of the present invention and is a perspective view showing the optical unit which is disassembled to a fixed body, a gimbal mechanism and a movable body.
Figure 24:
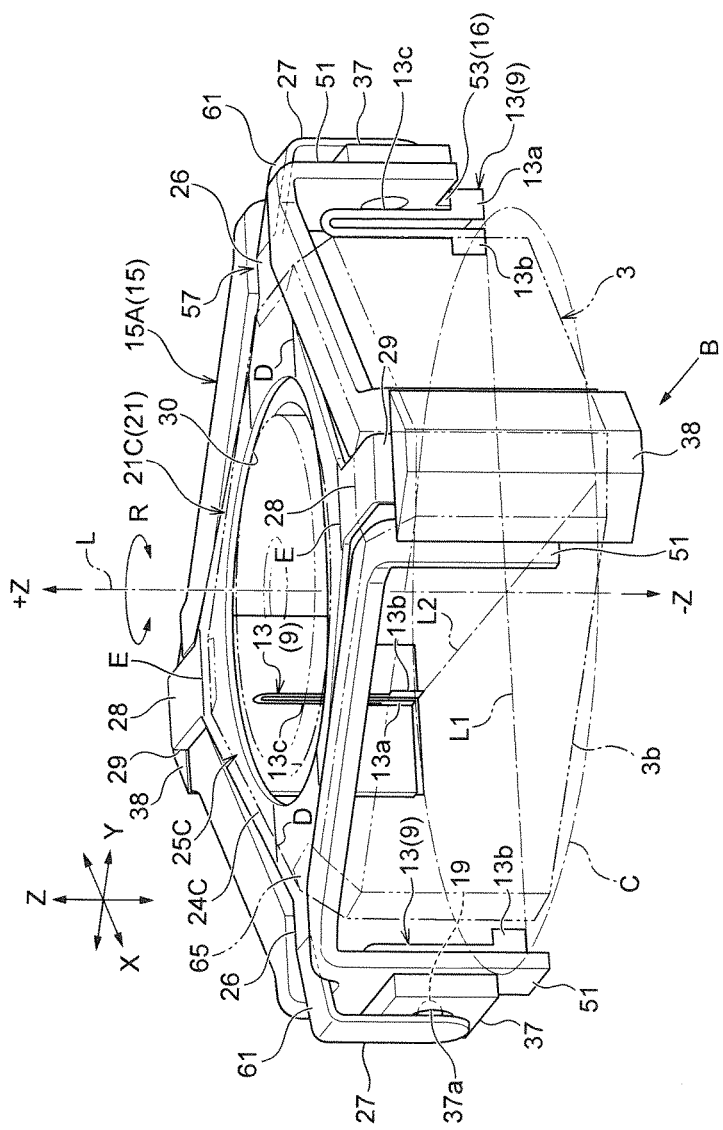
FIG. 24 is a view showing the fourth embodiment of the present invention and is a perspective view showing a gimbal mechanism, an intermediate frame body, a first bearing part, a second bearing part, an elastic member and an optical module of the optical unit.
Figure 25:
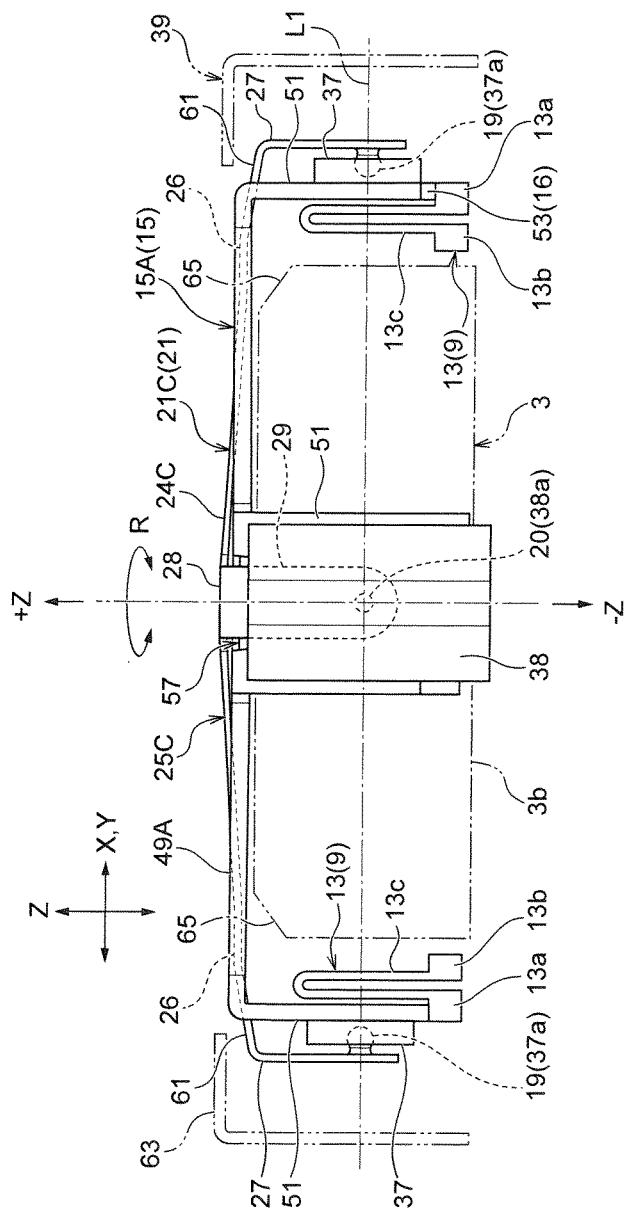
FIG. 25 is a view showing the fourth embodiment of the present invention and is a view showing a gimbal mechanism, an intermediate frame body, a first bearing part, a second bearing part, an elastic member and an optical module of the optical unit which is viewed in a direction of the arrow "B" in FIG. 24.

Further, as shown in FIG. 18 and FIG. 19, in this embodiment, a top face part 63 of the outer casing 39 is provided at a position facing the tip end part of the first extended part 26 where the first retreated part 61 of the gimbal frame part 25C is formed. However, it may be structured that the outer casing 39 is provided with no top face part 63.

Further, a bending angle of the tip end part of the first extended part 26 is set to an angle so that, when the gimbal frame part 25C is inclined and the first retreated part 61 comes close to the top face part 63 of the outer casing 39, the first retreated part 61 does not collide with a rear face of the top face part 63 of the outer casing 39.

In this embodiment, in a case that the outer casing 39 is structured so that no top face part 63 is provided, an bending angle of the tip end part of the first extended part 26 is set to an angle so that, when the gimbal frame part 25C is inclined and the first retreated part 61 is moved to an object side ("+Z" direction), the first retreated part 61 is not protruded from a surface on the object side of the outer casing 39.

In this embodiment, the first retreated part 61 may be formed in a recessed retreating part by bending a tip end part of the first extended part 26 to an inner side in an "U-shape or by curving to an inner side.

Further, also in the optical unit 1C in accordance with this embodiment structured as described above, operation and effects similar to the optical unit 1A in the first embodiment are provided and sizes of the optical unit 1C in the optical axis direction "Z" and the directions "X" and "Y" intersecting the optical axis can be reduced.

Further, according to the third embodiment, the first retreated part 61 is provided and thus, a size of the optical unit 1C in the optical axis direction "Z" can be further reduced.

[Fourth Embodiment] (see FIG. 22 Through FIG. 25)

An optical unit 1D in accordance with a fourth embodiment of the present invention is basically structured similarly to the optical unit 1A in accordance with the first embodiment and, as a structure to further reduce a size of the optical unit 1D in the optical axis direction "Z", the optical unit 1D is an embodiment in which the first retreated part 61 is provided in the gimbal frame part 25C and a second retreated part 65 is provided in a housing 3b of the optical module 3 so as to be along an inner face of the gimbal frame part 25C.

Therefore, in the following descriptions, similar structures to the first embodiment and the third embodiment are shown by using the same reference signs in the drawings and their descriptions are omitted, and a structure of the second retreated part 65 which is a specific structure in the fourth embodiment different from the first embodiment and its operation and effect will be mainly described.

In the fourth embodiment, the first retreated parts 61 described in the third embodiment are provided in the gimbal mechanism 21C and second retreated parts 65 retreated in the same direction as the first retreated parts 61 are provided in portions of the movable body 5 along the gimbal frame part 25C at positions corresponding to the first support part extended parts 27 and the second support part extended parts 29.

Specifically, in the housing 3b of the optical module 3 which faces the tip end parts of the first extended parts 26 and the tip end parts of the second extended parts 28 of the gimbal frame part 25C, corner parts of the housing 3b of the optical module 3 in a rectangular shape when viewed in the optical axis direction "Z" are, as an example, obliquely cut and chamfered and thereby, second retreated parts 65 structured of inclined faces are provided.

Further, the second retreated part 65 may be provided on an entire periphery of an edge portion including the corner parts on the object side "+Z" of the housing 3b of the optical module 3.

Further, the second retreated part 65 is not limited to the inclined face. The second retreated part 65 may be structured so that a corresponding portion of the housing 3b of the optical module 3 is formed to be a stepped part which is recessed in an "L"-shape to the opposite side "−Z" to an object to be photographed, or to be a curving recessed part.

Further, an optical unit 1 may be structured so that only the second retreated parts 65 are provided without the first retreated parts 61.

Further, the optical unit 1D in accordance with this embodiment structured as described above also exhibits operation and effects similar to the optical unit 1A in the first embodiment and sizes of the optical unit 1D in the optical axis direction "Z" and the directions "X" and "Y" intersecting the optical axis can be reduced.

Further, according to the fourth embodiment, the first retreated part 61 and the second retreated part 65 are provided and thus, a size of the optical unit 1D in the optical axis direction "Z" can be further reduced. In this embodiment, in a case that the optical unit 1 is only provided with the second retreated part 65 without the first retreated part 61, an operation and effect can be obtained in which a size of the optical unit 1 in the optical axis direction "Z" can be reduced in the portions of the second retreated parts 65.

[Fifth Embodiment] (FIG. 26 Through FIG. 29)

An optical unit 1E in accordance with a fifth embodiment of the present invention is basically structured similarly to the optical unit 1A in accordance with the first embodiment and, as a structure to further reduce a size of the optical unit 1E in the optical axis direction "Z", the optical unit 1E is an embodiment in which the first retreated part 61 is provided in the gimbal frame part 25C and a third retreated part 67 is provided in an intermediate frame body 15E.

Therefore, in the following descriptions, similar structures to the first embodiment and the third embodiment are shown by using the same reference signs in the drawings and their descriptions are omitted, and a structure of the third retreated part 67 which is a specific structure in the fifth embodiment different from the first embodiment and its operation and effect will be mainly described.

In the fifth embodiment, an intermediate frame body 15E is provided which turnably holds the optical module 3 around the optical axis "L" through the elastic members 13 and, in addition, which is supported by the first support parts 19 through the first bearing members 37.

In this embodiment, a basic structure of the intermediate frame body 15E is similar to the intermediate frame body 15A of the optical unit 1A in accordance with the first embodiment and thus, its detailed description is omitted.

In addition, in the fifth embodiment, similarly to the intermediate frame body 15A in accordance with the first embodiment, the intermediate frame body 15E is provided with a flat plate part 49E disposed on the object side "+Z" with respect to the optical module 3, and side plate parts 51 which are extended from the flat plate part 49E to the opposite side "−Z" to an object to be photographed in the optical axis direction "Z" and are respectively located along the first support part extended parts 27 and the second support part extended parts 29. The third retreated part 67 which is retreated in the same direction as the first retreated part 61 is provided in first connection parts 66 extended to outer sides in the first axial line "L1" direction and in second connection parts 68 extended to outer sides in the second axial line "L2" direction, where the flat plate part 49E is connected with the side plate parts 51.

Specifically, tip end parts or all of the first connection part 66 and the second connection part 68 which are connected with the side plate parts 51 and are extended along the first support part extended part 27 and the second support part extended part 29 are, similarly to the first retreated part 61, bent to the opposite side "−Z" to an object to be photographed and set in inclined states. In this manner, the third retreated parts 67 are formed and positions of the connecting portions with the side plate parts 51 are located on the opposite side "−Z" to an object to be photographed with respect to the face of the gimbal frame part 25C.

Further, similarly to the gimbal frame part 25C in the third embodiment, in a case that the intermediate frame body 15E in the fifth embodiment is a molded article which is unable to be bent or made of a board member having a large thickness, it may be structured that their corner parts are simply cut obliquely and chamfered to form a substantially octagonal shape when viewed in the optical axis direction "Z" and, in this manner, the third retreated parts 67 are formed.

Figure 26:
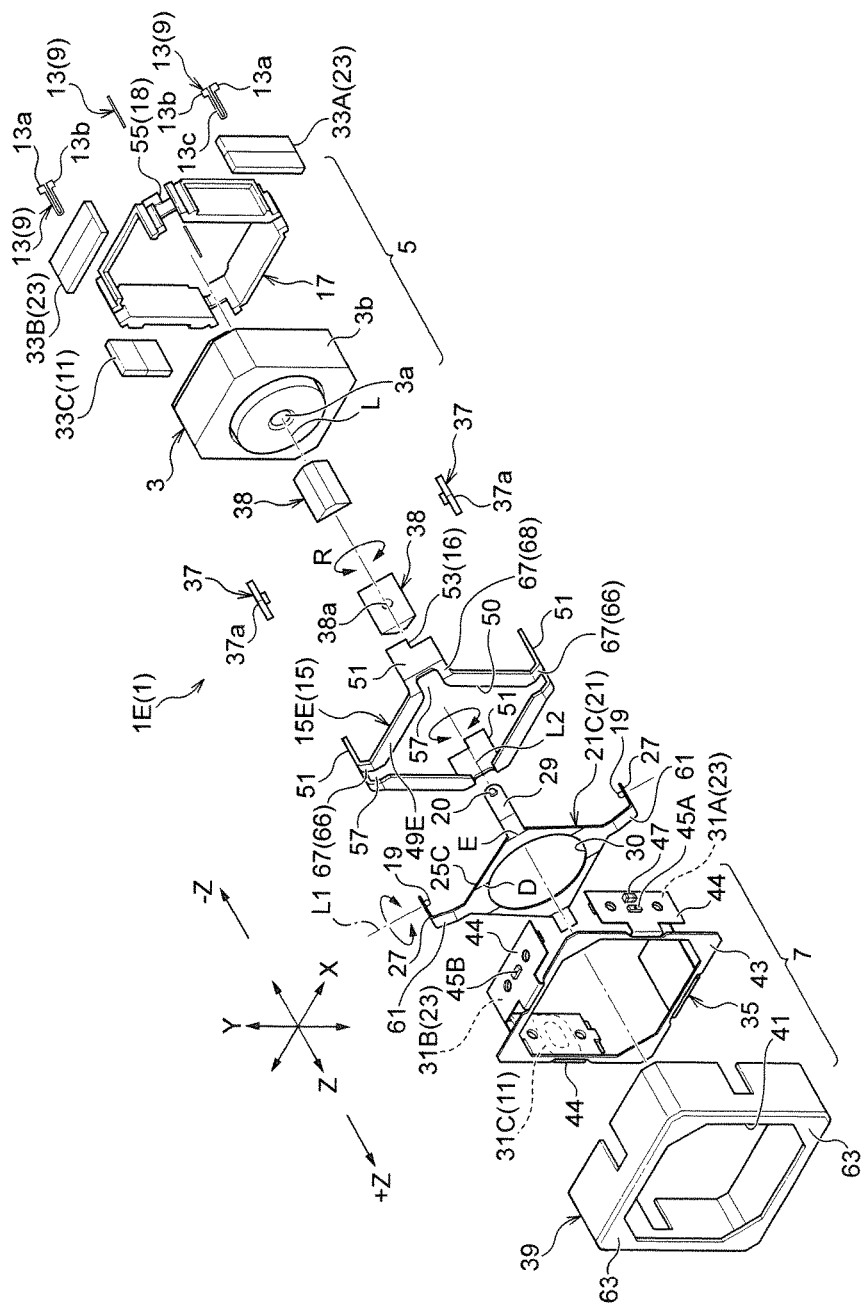
FIG. 26 is a view showing a fifth embodiment of the present invention and is a perspective view showing an entire optical unit which is disassembled.
Figure 27:
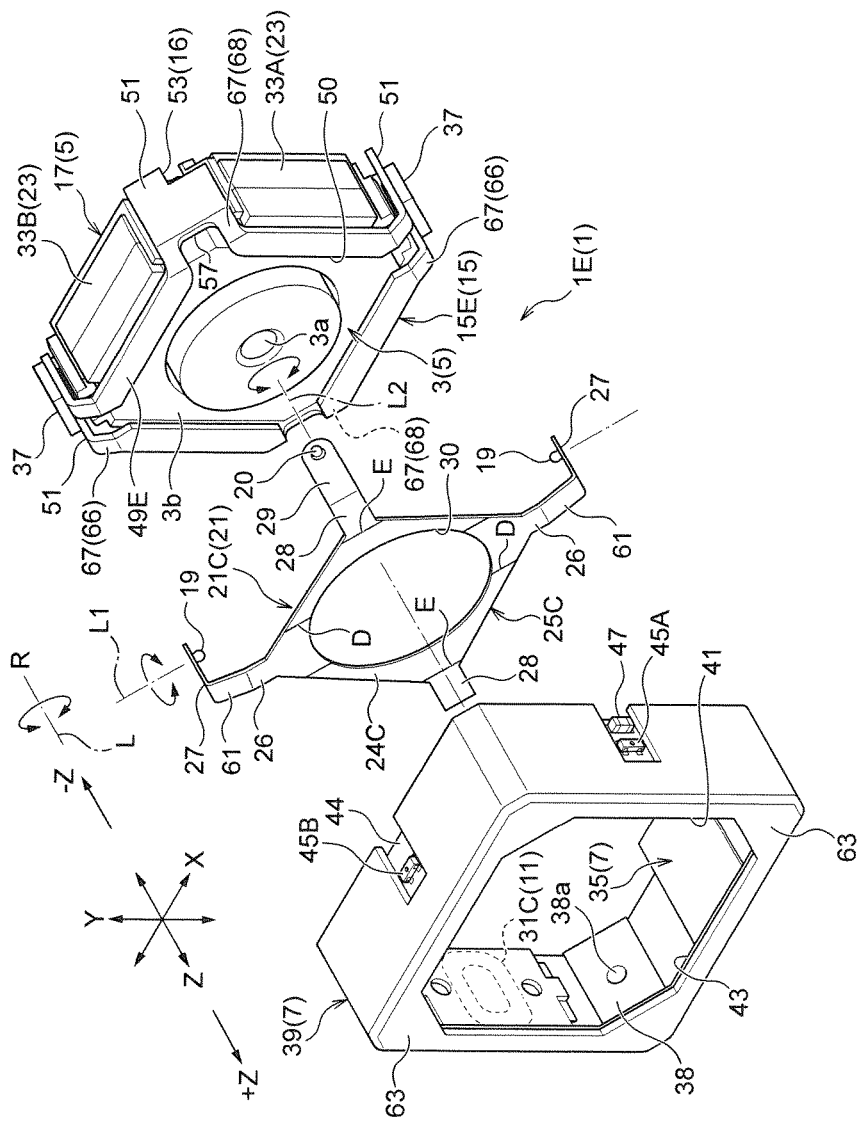
FIG. 27 is a view showing the fifth embodiment of the present invention and is a perspective view showing the optical unit which is disassembled to a fixed body, a gimbal mechanism and a movable body.
Figure 28:
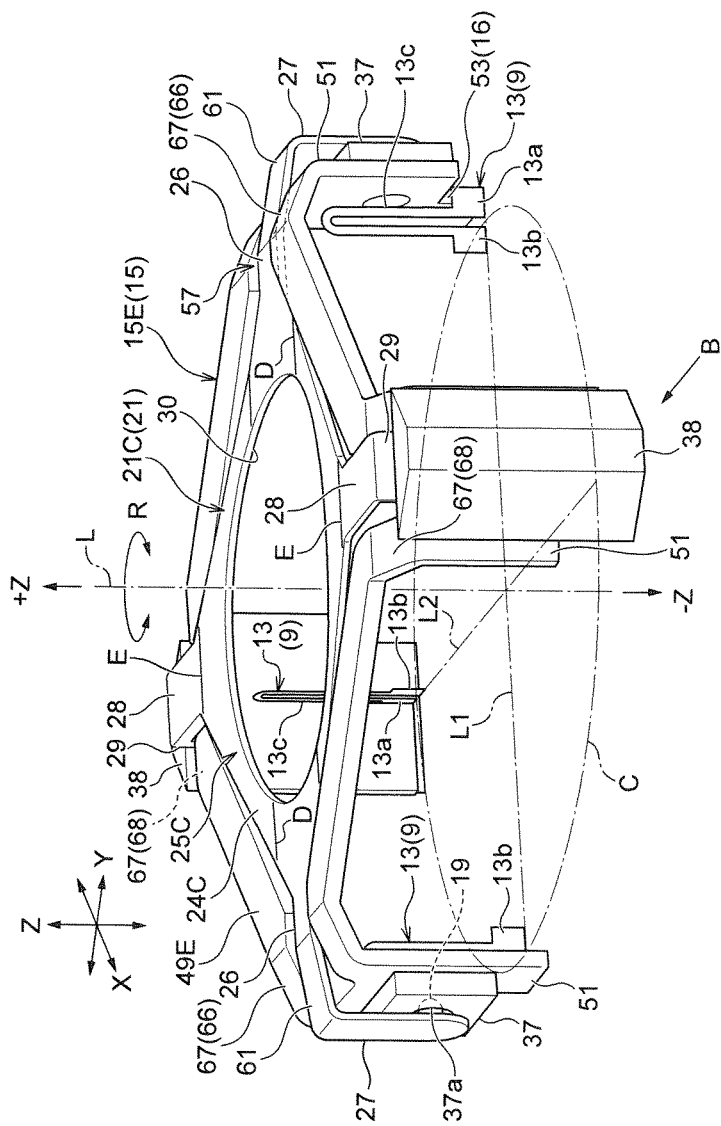
FIG. 28 is a view showing the fifth embodiment of the present invention and is a perspective view showing a gimbal mechanism, an intermediate frame body, a first bearing part, a second bearing part and an elastic member of the optical unit.
Figure 29:
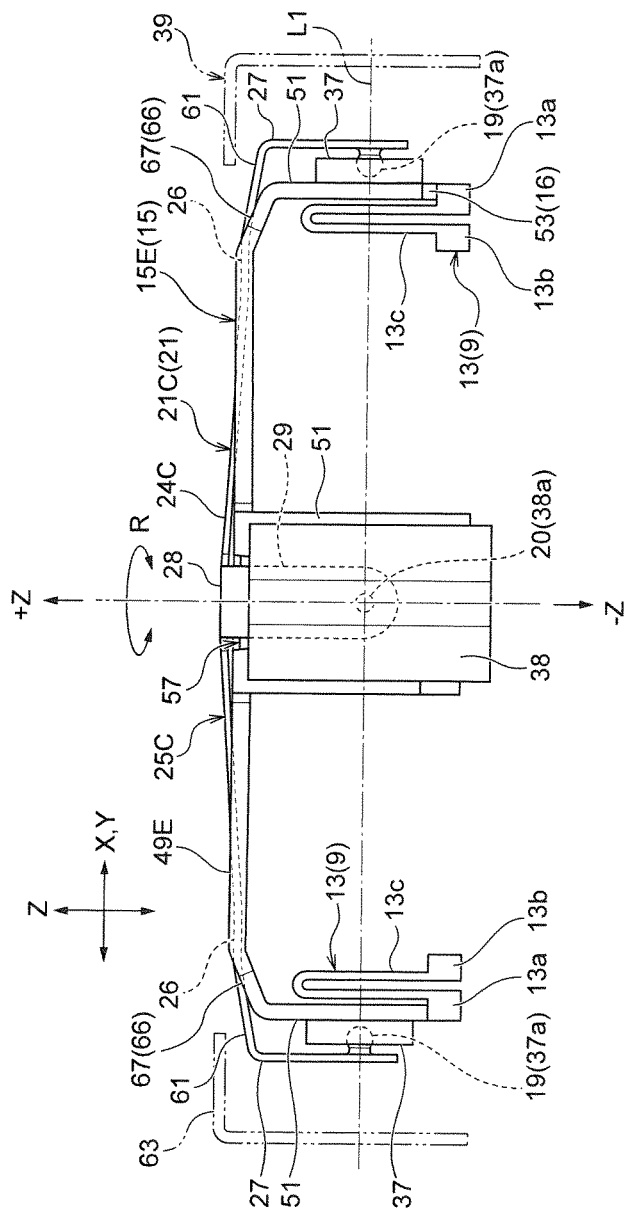
FIG. 29 is a view showing the fifth embodiment of the present invention and is a view showing a gimbal mechanism, an intermediate frame body, a first bearing part, a second bearing part and an elastic member of the optical unit which is viewed in a direction of the arrow "B" in FIG. 28.

Further, as shown in FIG. 26 and FIG. 27, also in this embodiment, similarly to the third embodiment, the top face part 63 of the outer casing 39 exists at positions facing the respective tip end parts or all of the first connection parts 66 and the second connection parts 68 where the third retreated parts 67 of the intermediate frame body 15E are formed. However, an outer casing 39 having no top face part 63 may be used.

Further, bending angles of tip end parts of the first connection part 66 and the second connection part 68 are set to an angle so that, when the intermediate frame body 15E is inclined and thereby the first connection part 66 or the second connection part 68 comes close to the top face part 63 of the outer casing 39, the first connection part 66 and the second connection part 68 are not protruded from a surface of the top face part 63 of the outer casing 39.

In addition, the third retreated part 67 may be, similarly to the first retreated part 61, formed in a recessed retreating part by bending the tip end parts of the first connection part 66 and the second connection part 68 to an inner side in an "L"-shape or by curving to an inner side or the like.

Further, the optical unit 1 may be provided with only the third retreated parts 67 without the first retreated parts 61 and, in addition, the second retreated part 65 may be provided so that the optical unit 1 is provided with the second retreated parts 65 and the third retreated parts 67. Alternatively, the optical unit 1 may be provided with all of the first retreated parts 61, the second retreated parts 65 and the third retreated parts 67.

Further, the optical unit 1E in accordance with this embodiment structured as described above also exhibits operation and effects similar to the optical unit 1A in the first embodiment and sizes of the optical unit 1E in the optical axis direction "Z" and the directions "X" and "Y" intersecting the optical axis can be reduced.

Further, according to the fifth embodiment, the first retreated parts 61 and the third retreated parts 65 are provided and thus, a size of the optical unit 1E in the optical axis direction "Z" can be further reduced.

Further, in a case that the optical unit 1 is provided with only the third retreated parts 67 without the first retreated part 61, an operation and effect can be obtained in which a size in the optical axis direction "Z" of the optical unit 1 can be reduced in the portions of the third retreated parts 67.

Further, in a case that the optical unit 1 is provided with the second retreated parts 65 in addition to the third retreated parts 67, it is conceivable that an operation and effect of the second retreated parts 65 may not be large due to existence of the intermediate frame body 15E. However, in a structure that the housing 3b of the optical module 3 is completely accommodated in the opening part 50 of the intermediate frame body 15E, and the flat plate part 49E of the intermediate frame body 15E and a surface on the object side "+Z" of the housing 3b of the optical module 3 are flush with each other, an operation and effect of the second retreated parts 65 may be largely obtained.

Figure 30:
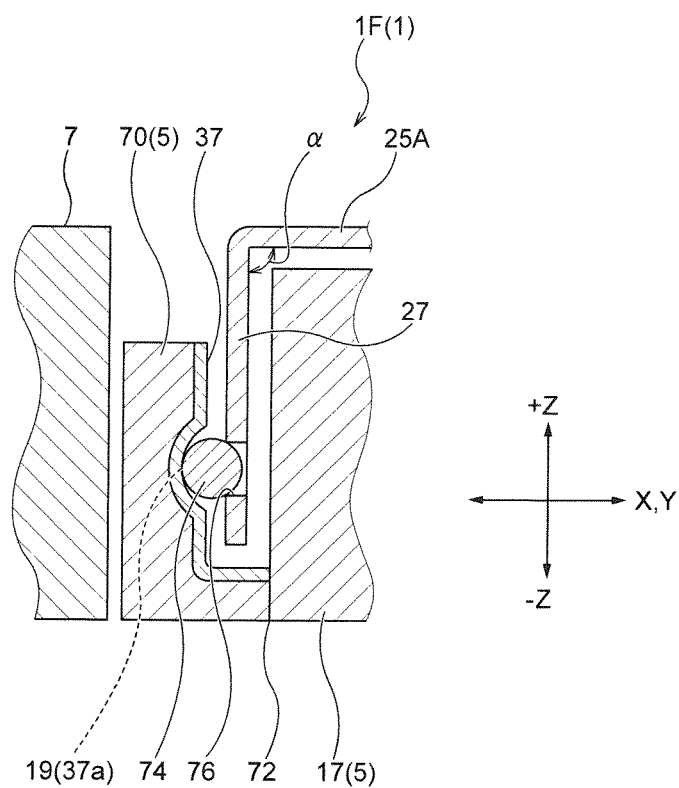
FIG. 30 is a view showing a sixth embodiment of the present invention and is an enlarged longitudinal cross-sectional view showing a portion of a first support part.

[Sixth Embodiment] (see FIG. 30)

An optical unit 1F in accordance with a sixth embodiment of the present invention is basically structured similarly to the optical unit 1A in accordance with the first embodiment and a structure of the first support part 19 is different from that in the first embodiment. Therefore, in the following descriptions, similar structures to the first embodiment are shown by using the same reference signs in the drawings and their descriptions are omitted, and a specific structure in the sixth embodiment different from the first embodiment will be mainly described.

In the optical unit 1F in accordance with the sixth embodiment, as shown in FIG. 30, the movable body 5 is provided with an outer side portion 70 on an outer side with respect to the first support part extended part 27. In this embodiment, the outer side portion 70 is provided in a portion of the holder frame 17 of the movable body 5 corresponding to the first support part extended part 27 so as to surround the first support part extended part 27 from an outer side. In this embodiment, the outer side portion 70 and the holder frame 17 are adhesively bonded and integrated with each other by an adhesive 72, but they may be integrally formed with each other by molding.

The first support part 19 is fixed to an outer side of the first support part extended part 27 which faces the outer side portion 70 of the movable body 5. As described above, this embodiment is different from the above-mentioned embodiments in a structure that the first support part 19 is fixed to an outer side instead of an inner side of the first support part extended part 27. A portion of the first support part 19 which contacts and supports the outer side portion of the movable body 5 is a convex curved face which is the same structure as the above-mentioned embodiments. In the sixth embodiment, the first support part 19 is welded and fixed in a state that a spherical body 74 is accommodated in a hole part 76 formed at a corresponding position of the first support part extended part 27. A first bearing member 37 is fixed in a portion of the outer side portion 70 which is contacted with the convex curved face of the first support part 19. A recessed part 37a of the first bearing member 37 is a concave spherical surface similarly to the first embodiment.

The second support part 20 is the same as that in the above-mentioned embodiment and thus its description is omitted.

According to the sixth embodiment, similarly to the first embodiment, the first support part 19 and the second support part 20 of the gimbal mechanism 21 are formed of a convex curved face and thus, the gimbal mechanism 21 and the members of the movable body 5 and the fixed body 7 are easily assembled. Further, the first support part 19 is fixed on an outer side with respect to the first support part extended part 27 and thus, variations of a structure of the gimbal mechanism 21 are increased and a degree of freedom in design of the optical unit 1F is enhanced.

Further, as shown in FIG. 30, in a state that the gimbal frame part 25A is a single unit, in the sixth embodiment, an extended angle "α" of the first support part extended part 27 with respect to the gimbal frame part 25A is set to an angle (α>90°) displaced to an outer side so as to elastically contact with a member of the movable body 5.

As a result, the first support part 19 is elastically contacted with the first bearing member 37 of the movable body 5. The second support part 20 is, as described above, elastically contacted with the second bearing member 38. In other words, both of the first support part 19 and the second support part 20 are elastically contacted and thus, pressurization is applied to the both point contact parts and strong support and smooth swinging which has less possibility of coming off can be attained.

Figure 31:
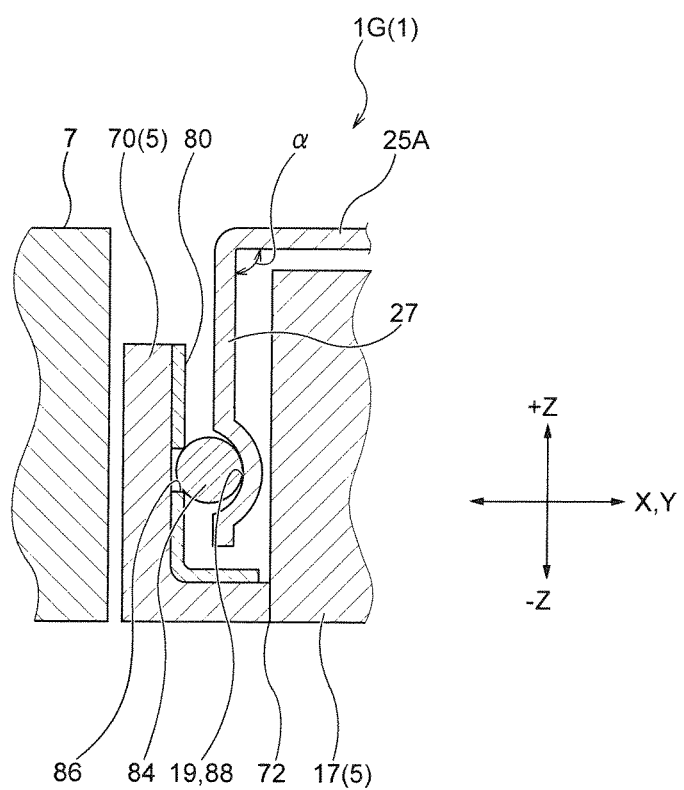
FIG. 31 is a view showing a seventh embodiment of the present invention and is an enlarged longitudinal cross-sectional view showing a portion of a first support part.

[Seventh Embodiment] (see FIG. 31)

An optical unit 1G in accordance with a seventh embodiment of the present invention is basically structured similarly to the optical unit 1F in accordance with the sixth embodiment and a structure of the first support part 19 is different from that in the sixth embodiment.

Therefore, in the following descriptions, similar structures to the sixth embodiment are shown by using the same reference signs in the drawings and their descriptions are omitted, and a specific structure in the seventh embodiment different from the sixth embodiment will be mainly described.

In the optical unit 1G in accordance with the seventh embodiment, as shown in FIG. 31, the movable body 5 is, similarly to the sixth embodiment, provided with an outer side portion 70 on an outer side with respect to the first support part extended part 27. The outer side portion 70 is fixed with a protruded part 84. The protruded part 84 is welded and fixed in a state that the protruded part 84 is accommodated in a hole part 86 provided at a corresponding position of the metal plate 80. The metal plate 80 is adhesively bonded to the outer side portion 70. As a result, the protruded part 84 is fixed to the outer side portion 70 through the metal plate 80. The protruded part 84 is structured of a spherical body and its tip end part is a convex curved face.

The first support part 19 is formed on an outer side of the first support part extended part 27 so as to face the protruded part 84 of the movable body 5. A portion of the first support part 19 which contacts and supports the protruded part 84 is, different from the sixth embodiment, a concave spherical surface 88. In other words, the concave spherical surface 88 of the first support part 19 corresponds to the recessed part 37a of the first bearing member 37 in the sixth embodiment.

The second support part 20 is the same as that in the above-mentioned embodiment and thus, the description is omitted.

According to the seventh embodiment, the first support part 19 of the gimbal mechanism 21 is formed of a concave spherical surface 88 and the second support part 20 is formed of a convex curved face and thus, the gimbal mechanism 21 and the members of the movable body 5 and the fixed body 7 are easily assembled. Further, the first support part 19 is formed as a concave spherical surface 88 on an outer side of the first support part extended part 27 and thus, variations of a structure of the gimbal mechanism 21 are increased and a degree of freedom in design of the optical unit 1G is enhanced.

Further, as shown in FIG. 31, in a state that the gimbal frame part 25A is a single unit, in the seventh embodiment, an extended angle "α" of the first support part extended part 27 with respect to the gimbal frame part 25A is set to an angle (α>90°) displaced to an outer side so as to elastically contact with a member of the movable body 5.

As a result, the first support part 19 is elastically contacted with the protruded part 84 of the movable body 5. The second support part 20 is, as described above, elastically contacted with the second bearing member 38. In other words, both of the first support part 19 and the second support part 20 are elastically contacted and thus, pressurization is applied to the both point contact parts and strong support and smooth swinging which has less possibility of coming off can be attained.

Figure 32:
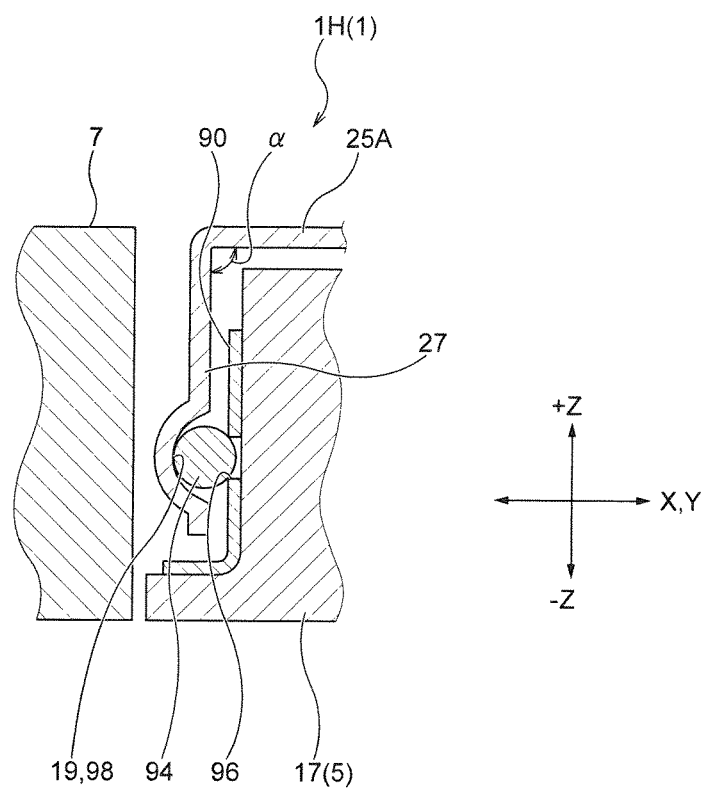
FIG. 32 is a view showing an eighth embodiment of the present invention and is an enlarged longitudinal cross-sectional view showing a portion of a first support part.

[Eighth Embodiment] (see FIG. 32)

An optical unit 1H in accordance with an eighth embodiment of the present invention is basically structured similarly to the optical unit 1G in accordance with the seventh embodiment and a structure of the first support part 19 is different from that in the seventh embodiment. Therefore, in the following descriptions, similar structures to the seventh embodiment are shown by using the same reference signs in the drawings and their descriptions are omitted, and a specific structure in the eighth embodiment different from the seventh embodiment will be mainly described.

In the optical unit 1H in accordance with the eighth embodiment, as shown in FIG. 32, the movable body 5 is provided with no outer side portion 70 in the seventh embodiment. A protruded part 94 is fixed in a portion of the movable body 5 on an inner side with respect to the first support part extended part 27. The protruded part 94 is welded and fixed in a state that the protruded part 94 is accommodated in a hole part 96 provided at a corresponding position of the metal plate 90. The metal plate 90 is adhesively bonded to the movable body 5. In this manner, the protruded part 94 is fixed to the movable body 5 through the metal plate 90. The protruded part 94 is structured of a spherical body and its tip end part is a convex curved face.

The first support part 19 is formed on an inner side of the first support part extended part 27 which faces the protruded part 94 of the movable body 5. A portion of the first support part 19 which contacts and supports the protruded part 94 is a concave spherical surface 98 similarly to the seventh embodiment. In other words, the concave spherical surface 98 of the first support part 19 corresponds to the recessed part 37a of the first bearing member 37 in the sixth embodiment.

The second support part 20 is the same as that in the above-mentioned embodiment and thus the description is omitted.

According to the eighth embodiment, similarly to the seventh embodiment, the first support part 19 of the gimbal mechanism 21 is formed of a concave spherical surface 98 and the second support part 20 is formed of a convex curved face and thus, the gimbal mechanism 21 and the members of the movable body 5 and the fixed body 7 are easily assembled. Further, the first support part 19 is formed as the concave spherical surface 98 on an inner side of the first support part extended part 27 and thus, variations of a structure of the gimbal mechanism 21 are increased and a degree of freedom in design of the optical unit 1H is enhanced.

Further, as shown in FIG. 32, in a state that the gimbal frame part 25A is a single unit, in the eighth embodiment, an extended angle "α" of the first support part extended part 27 with respect to the gimbal frame part 25A is set to an angle (α<90°) displaced to an inner side so as to elastically contact with the protruded part 94 which is a member of the movable body 5.

As a result, the first support part 19 is elastically contacted with the protruded part 94 of the movable body 5. The second support part 20 is, as described above, elastically contacted with the second bearing member 38. In other words, both of the first support part 19 and the second support part 20 are elastically contacted and thus, pressurization is applied to the both point contact parts and strong support and smooth swinging with less possibility of coming off can be attained.

Other Embodiments

The optical unit 1 in accordance with the present invention is basically provided with the above-mentioned structure. However, various changes and modifications will be apparent to those skilled in the art from the teachings herein.

For example, the number of the elastic members 13 is four at intervals of 90° in the first embodiment and the second embodiment. However, three elastic members 13 may be disposed at intervals of 120°, or five or more elastic members 13 may be disposed, for example, five elastic members 13 are disposed at intervals of 72°. Further, in a case that a plate spring having a thin plate thickness is used as the elastic member 13, when a plurality of plate springs is laminated and used, a required elastic force can be secured. Further, in this case, when postures of laminated plate springs are alternately changed in reverse directions in the optical axis direction "Z" so that fixed (engaging) positions of the plate springs are disposed dividedly on the object side "+Z" and the opposite side "−Z" to an object to be photographed in the optical axis direction "Z", a further uniform force around the optical axis "L" without twisting is applied to the holder frame 17 and the intermediate frame body 15.

Further, the optical module 3 is not limited to the camera module described in the above-mentioned embodiments. The optical module 3 may be another module such as a laser irradiation module or an optical sensor module. Further, in a case that the optical module 3 is formed in another shape such as a cylindrical tube shape, shapes such as the holder frame 17 and the coil attaching frame 35 may be formed in a shape corresponding to the shape of the optical module 3.

Further, in the first embodiment and the second embodiment, swing directions of the gimbal mechanism 21 are set to a swing around the first axial line "L1" which is inclined by +45° and a swing around the second axial line "L2" which is inclined by −45°, both of which pass through the facing corner parts of the gimbal frame part 25. However, the first axial line "L1" and the second axial line "L2" may be set to a vertical direction of ±0° which is the pitching direction "Y" and a horizontal direction of ±90° which is the yawing direction "X".

Further, in the first embodiment and the second embodiment, a shake of the optical unit 1A is detected based on variations of magnetic flux densities by respective sets of the magnetic sensors (Hall element) 45A, 45B and 45C and the paired magnets 33A, 33B and 33C. However, the present invention is not limited to this structure. For example, it may be structured that a shake is detected by a gyroscope (shake detection sensor) described in Patent Literature 1.

In addition, the first retreated part 61 provided in the third embodiment, the second retreated part 65 provided in the fourth embodiment and the third retreated part 67 provided in the fifth embodiment may be applied to the optical unit 1B in accordance with the second embodiment in which the gimbal frame part 25B is disposed on the opposite side "−Z" to an object to be photographed in the optical axis direction "Z".

Further, in the above-mentioned embodiments, the second support part 20 is fixed to an outer side of the second support part extended part 29 facing the fixed body 7, and the portion which is contacted and supported by the member of the fixed body 7 is a convex curved face. However, the present invention is not limited to the structure.

For example, it may be structured that the fixed body 7 is provided with an inner side portion on an inner side with respect to the second support part extended part 29, and the second support part 20 is fixed to an inner side of the second support part extended part 29 facing the inner side portion, and a portion contacting and supported by the inner side portion of the fixed body 7 is a convex curved face.

The invention claimed is:

1. An optical unit comprising:
a movable body comprising an optical module;
a fixed body which holds the movable body in a movable state;
a gimbal mechanism comprising:
a first support part which swingably supports the movable body around a first axial line intersecting an optical axis direction of the optical module; and
a second support part which is swingably supported by a member of the fixed body around a second axial line intersecting the optical axis direction and a direction of the first axial line; and
a shake correction drive mechanism structured to drive the movable body around the first axial line and around the second axial line;
wherein the gimbal mechanism comprises:
a gimbal frame part which is disposed on one of an object side and an opposite side to an object to be photographed with respect to the optical module;
a first support part extended part which is extended from the gimbal frame part in the optical axis direction and comprises the first support part;
a second support part extended part which is extended from the gimbal frame part in the optical axis direction and comprises the second support part; and
a first retreated part which is provided in a portion where the gimbal frame part is connected with the first support part extended part so as to lower a height in an extended direction of the first support part extended part with respect to a face of the gimbal frame part.

2. The optical unit according to claim 1, wherein the gimbal frame part is formed in a plate shape.

3. The optical unit according to claim 2, wherein at least one of the first support part extended part and the second support part extended part is formed in a plate shape.

4. The optical unit according to claim 1, wherein
the first support part is fixed to an inner side of the first support part extended part which faces the movable body, and a portion which contacts and supports a member of the movable body is a convex curved face, and
the second support part is fixed to an outer side of the second support part extended part which faces the fixed body, and a portion which is contacted and supported by a member of the fixed body is a convex curved face.

5. The optical unit according to claim 4, wherein
an extended angle of the first support part extended part with respect to the gimbal frame part is set to an angle displaced to an inner side so as to elastically contact with a member of the movable body, and
an extended angle of the second support part extended part with respect to the gimbal frame part is set to an angle displaced to an outer side so as to elastically contact with a member of the fixed body.

6. The optical unit according to claim 1, wherein
the movable body comprises an outer side portion located on an outer side with respect to the first support part extended part,
the first support part is fixed to an outer side of the first support part extended part which faces the outer side portion, and a portion which contacts and supports the outer side portion is a convex curved face, and
the second support part is fixed to an outer side of the second support part extended part which faces the fixed body, and a portion which is contacted and supported by a member of the fixed body is a convex curved face.

7. The optical unit according to claim 6, wherein
an extended angle of the first support part extended part with respect to the gimbal frame part is set to an angle displaced to an outer side so as to elastically contact with a member of the movable body, and an extended angle of the second support part extended part with respect to the gimbal frame part is set to an angle displaced to an outer side so as to elastically contact with a member of the fixed body.

8. The optical unit according to claim 1, wherein the movable body comprises an outer side portion located on an outer side with respect to the first support part extended part, the outer side portion comprises a fixed protruded part, the first support part is formed on an outer side of the first support part extended part so as to face the fixed protruded part, and a portion which contacts and supports the fixed protruded part is a concave spherical surface, and the second support part is fixed to an outer side of the second support part extended part which faces the fixed body, and a portion which is contacted and supported by a member of the fixed body is a convex curved face.

9. The optical unit according to claim 8, wherein an extended angle of the first support part extended part with respect to the gimbal frame part is set to an angle displaced to an outer side so as to elastically contact with a member of the movable body, and an extended angle of the second support part extended part with respect to the gimbal frame part is set to an angle displaced to an outer side so as to elastically contact with a member of the fixed body.

10. The optical unit according to claim 1, further comprising a protruded part fixed to a member of the movable body, wherein the first support part is formed on an inner side of the first support part extended part so as to face the protruded part of the movable body, and a portion which contacts and supports the protruded part is a concave spherical surface, and wherein the second support part is fixed to an outer side of the second support part extended part which faces the fixed body, and a portion which is contacted and supported by a member of the fixed body is a convex curved face.

11. The optical unit according to claim 10, wherein an extended angle of the first support part extended part with respect to the gimbal frame part is set to an angle displaced to an inner side so as to elastically contact with a member of the movable body, and an extended angle of the second support part extended part with respect to the gimbal frame part is set to an angle displaced to an outer side so as to elastically contact with a member of the fixed body.

12. The optical unit according to claim 1, wherein the gimbal frame part is formed in an "X"-shape by a first extended part which is extended in a direction of the first axial line and a second extended part which is extended in a direction of the second axial line with an optical axis as a center.

13. The optical unit according to claim 1, wherein the movable body comprises a second retreated part which is retreated in a same direction as the first retreated part in portions along the gimbal frame part which correspond to the first support part extended part and the second support part extended part.

14. The optical unit according to claim 13, wherein the movable body is formed in a rectangular shape when viewed in the optical axis direction, and the second retreated part is provided at corner parts of the movable body.

15. The optical unit according to claim 1, wherein the movable body comprises an intermediate frame body which turnably holds the optical module around an optical axis and is supported by the first support part.

16. The optical unit according to claim 15, wherein the intermediate frame body comprises:

a flat plate part which is disposed on one of an object side and an opposite side to an object to be photographed of the optical module;

side plate parts which are extended from the flat plate part in the optical axis direction and are respectively located along the first support part extended part and the second support part extended part; and a third retreated part which is provided in a portion where the flat plate part is connected with the side plate part and is retreated in a same direction as the first retreated part.

17. An optical unit comprising:

a movable body comprising an optical module;

a fixed body which holds the movable body in a movable state;

a gimbal mechanism comprising:

a first support part which swingably supports the movable body around a first axial line intersecting an optical axis direction of the optical module; and a second support part which is swingably supported by a member of the fixed body around a second axial line intersecting the optical axis direction and a direction of the first axial line; and a shake correction drive mechanism structured to drive the movable body around the first axial line and around the second axial line;

wherein the gimbal mechanism comprises:

a gimbal frame part which is disposed on one of an object side and an opposite side to an object to be photographed with respect to the optical module;

a first support part extended part which is extended from the gimbal frame part in the optical axis direction and comprises the first support part; and a second support part extended part which is extended from the gimbal frame part in the optical axis direction and comprises the second support part, wherein the gimbal frame part is formed in an "X"-shape by a first extended part which is extended in a direction of the first axial line and a second extended part which is extended in a direction of the second axial line with an optical axis as a center, wherein the gimbal mechanism is formed of a metal plate, and wherein the first support part extended part and the second support part extended part are formed by bending the first extended part and the second extended part of the gimbal frame part which is formed in the "X"-shape.

18. The optical unit according to claim 17, wherein a gap space between the second extended part of the gimbal frame part and the movable body is larger than a gap space between the first extended part and the movable body.

19. The optical unit according to claim 17, wherein the gimbal frame part is disposed on an object side with respect to the optical module, and a center part of the gimbal frame part on a light incident part side of the optical module is formed with an opening part.

20. The optical unit according to claim 17, wherein
the shake correction drive mechanism is structured of a set of a coil and a magnet, and
one of the coil and the magnet is disposed on the fixed body and an other is disposed on the movable body.

21. The optical unit according to claim 17, wherein
the first support part is fixed to an inner side of the first support part extended part which faces the movable body, and a portion which contacts and supports a member of the movable body is a convex curved face, and
the second support part is fixed to an outer side of the second support part extended part which faces the fixed body, and a portion which is contacted and supported by a member of the fixed body is a convex curved face.

22. The optical unit according to claim 17, wherein
the movable body comprises an outer side portion located on an outer side with respect to the first support part extended part,
the first support part is fixed to an outer side of the first support part extended part which faces the outer side portion, and a portion which contacts and supports the outer side portion is a convex curved face, and
the second support part is fixed to an outer side of the second support part extended part which faces the fixed body, and a portion which is contacted and supported by a member of the fixed body is a convex curved face.

23. The optical unit according to claim 17, wherein
the movable body comprises an outer side portion located on an outer side with respect to the first support part extended part,
the outer side portion comprises a fixed protruded part,
the first support part is formed on an outer side of the first support part extended part so as to face the fixed protruded part, and a portion which contacts and supports the fixed protruded part is a concave spherical surface, and
the second support part is fixed to an outer side of the second support part extended part which faces the fixed body, and a portion which is contacted and supported by a member of the fixed body is a convex curved face.

24. The optical unit according to claim 17, further comprising a protruded part fixed to a member of the movable body,
wherein the first support part is formed on an inner side of the first support part extended part so as to face the protruded part of the movable body, and a portion which contacts and supports the protruded part is a concave spherical surface, and
wherein the second support part is fixed to an outer side of the second support part extended part which faces the fixed body, and a portion which is contacted and supported by a member of the fixed body is a convex curved face.

* * * * *